(12) United States Patent
Boutami et al.

(10) Patent No.: US 11,204,308 B2
(45) Date of Patent: Dec. 21, 2021

(54) OPTICAL DETECTOR OF PARTICLES

(71) Applicant: COMMISSARIAT A L'ENERGIE ATOMIQUE ET AUX ENERGIES ALTERNATIVES, Paris (FR)

(72) Inventors: Salim Boutami, Grenoble (FR); Sergio Nicoletti, Sinard (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 29 days.

(21) Appl. No.: 16/480,136

(22) PCT Filed: Jan. 25, 2018

(86) PCT No.: PCT/EP2018/051890
§ 371 (c)(1),
(2) Date: Oct. 2, 2019

(87) PCT Pub. No.: WO2018/138223
PCT Pub. Date: Aug. 2, 2018

(65) Prior Publication Data
US 2020/0033244 A1  Jan. 30, 2020

(30) Foreign Application Priority Data
Jan. 25, 2017 (FR) ..................... 17 50588

(51) Int. Cl.
*G01N 15/02* (2006.01)
*G01N 21/47* (2006.01)
(Continued)

(52) U.S. Cl.
CPC ......... *G01N 15/0211* (2013.01); *G01N 15/14* (2013.01); *G01N 21/4788* (2013.01); *G01N 15/06* (2013.01); *G01N 2015/1493* (2013.01)

(58) Field of Classification Search
CPC ............... G01N 21/4788; G01N 21/53; G01N 15/1436; G01N 15/1459; G01N 15/14;
(Continued)

(56) References Cited

U.S. PATENT DOCUMENTS

| | | | | |
|---|---|---|---|---|
| 4,733,073 A | * | 3/1988 | Becker | H01L 21/67253 250/281 |
| 5,007,737 A | * | 4/1991 | Hirleman, Jr. | G01N 15/0211 356/335 |

(Continued)

FOREIGN PATENT DOCUMENTS

DE  42 30 087 A1  3/1994
FR  2 963 101 A1  1/2012

OTHER PUBLICATIONS

International Search Report dated Apr. 26, 2018 in PCT/EP2018/051890 filed on Jan. 25, 2018.
(Continued)

*Primary Examiner* — Sang H Nguyen
(74) *Attorney, Agent, or Firm* — Oblon, McClelland, Maier & Neustadt, L.L.P.

(57) ABSTRACT

The present invention relates to a particle detector comprising at least an optical device configured to emit a luminous radiation; and a substrate extending in a plane and defining a channel intended to receive particles, the channel extending principally in a direction perpendicular to the principal plane; characterised in that the detector comprises a matrix of photo detectors and a reflecting surface; the matrix of photo detectors and the reflecting surface being disposed on mutually parallel planes and situated on either side of said portion of the substrate so that a part of the luminous radiation passes through the channel by being diffracted by a particle, then reflects off the reflecting surface, and then reaches the matrix of photo detectors.

20 Claims, 10 Drawing Sheets

(51) Int. Cl.
*G01N 15/14* (2006.01)
*G01N 15/06* (2006.01)

(58) Field of Classification Search
CPC .............. G01N 15/0211; G01N 15/06; G01N 2015/0046; G01N 2015/1486; G01N 2015/1493
See application file for complete search history.

(56) References Cited

U.S. PATENT DOCUMENTS

| | | | | |
|---|---|---|---|---|
| 5,273,633 | A * | 12/1993 | Wang | G01N 21/05 204/452 |
| 5,726,751 | A | 3/1998 | Altendorf et al. | |
| 5,793,485 | A * | 8/1998 | Gourley | G01N 15/1429 356/318 |
| 6,661,035 | B2 | 12/2003 | Negro et al. | |
| 7,547,904 | B2 * | 6/2009 | Schmidt | B01L 3/502715 250/573 |
| 8,821,799 | B2 * | 9/2014 | Bassler | G01N 15/147 422/105 |
| 9,671,325 | B2 * | 6/2017 | Takeda | G01N 15/0205 |
| 2002/0163003 | A1 | 11/2002 | Dal Negro et al. | |
| 2003/0169422 | A1 * | 9/2003 | Mukai | G02B 6/4225 356/399 |
| 2011/0228256 | A1 * | 9/2011 | Allier | G01N 21/41 356/36 |
| 2011/0294139 | A1 * | 12/2011 | Takeda | G01N 15/1484 435/7.1 |
| 2012/0044485 | A1 * | 2/2012 | Benisty | B82Y 15/00 356/218 |
| 2013/0120749 | A1 | 5/2013 | Nicoletti | |
| 2013/0230912 | A1 * | 9/2013 | Nukaga | B23K 26/0624 435/288.7 |
| 2015/0011671 | A1 | 4/2015 | Nicoletti | |
| 2016/0077218 | A1 * | 3/2016 | Loi | G01N 15/06 250/370.02 |
| 2017/0082975 | A1 * | 3/2017 | Gliere | G01N 21/41 |

OTHER PUBLICATIONS

Laere, F. V. et al., "Compact Focusing Grating Couplers for Silicon-on-Insulator Integrated Circuits", IEEE Photonics Technology Letters, vol. 19, No. 23, 2007, pp. 1919-1921.

Iliescu, C., "Wet Etching of Glass for MEMS Applications", Romanian Journal of Information Science and Technology, vol. 9, No. 4, 2006, pp. 285-309.

* cited by examiner

Détail B

A-A

A-A

B-B

Détail A

Détail B

A-A

A-A

A-A

A-A

A-A

A-A

A-A

A-A

OPTICAL DETECTOR OF PARTICLES

TECHNICAL FIELD OF THE INVENTION

The present invention relates to the field of the optical detection of particles in general and more particularly of particles of micrometric size, even nanometric size. It will have for a particularly advantageous but non-limiting application the detection of particles of dust, particles of smoke for detecting fires or the detection of polluting particles and in particular the so-called fine particles.

PRIOR ART

Particle detectors are generally based on the diffraction of visible light, or near infrared, by particles. These detectors thus generally comprise optical sensors configured to measure the diffraction of the light by the particles.

The detectors comprise a light source and a channel through which pass the particles to be detected. In the absence of particles, there is no diffraction, the optical sensors therefore do not measure light. In the presence of particles, the light is diffracted by the particles and the optical sensors detect the diffracted light in their solid angle of detection. This measurement thus makes it possible to detect one or several particles. Although the intensity of the diffracted light and its angular diagram are characteristics of the nature, form size and concentration of the particles, the known solutions do not make it possible to measure all of these characteristics in a true manner, at a reasonable cost and by occupying a limited space.

Document FR2963101 describes an existing solution. This solution provides a source of light conveyed by a waveguide that illuminates a channel etched in a substrate of silicon and through which particles will circulate. The diffraction of the incident light by these particles is detected by two peripheral photodiodes carried out on the silicon substrate.

This solution makes it possible to reduce the space of the sensor. On the other hand, it is extremely difficult with this type of solution to obtain information that are sufficiently precise and complete on the particles.

It is in particular difficult, even impossible, to determine the nature of the particles.

There is therefore a need that consists in proposing a solution for improving the precision and the quantity of information with respect to the particles, so as for example to determine the nature thereof.

Such is the objective of the present invention.

SUMMARY OF THE INVENTION

The present invention relates to a particle detector comprising at least:
  An optical device able to be connected to at least one light source and configured to emit at least one luminous radiation generated by said light source;
  A substrate extending in a principal plane (x, y) and defining a portion at least of a channel intended to receive a fluid comprising particles, the channel extending principally in a direction (z) perpendicular to the principal plane (x, y), a portion at least of the substrate being configured to receive a portion at least of the luminous radiation emitted by the optical device.
The detector further comprises a matrix of photo detectors and at least one reflecting surface, able to reflect the luminous radiation. The matrix of photo detectors and the reflecting surface are arranged on either side of said portion of the substrate. Advantageously, the detector is configured in such a way that if particles are present in the channel, a portion at least of the luminous radiation emitted by the optical device passes through the channel by being diffracted at least partially by at least one particle, then is reflected at least partially off the reflecting surface, then reaches at least partially the matrix of photo detectors.

The association of the channel, of the at least one reflecting surface and of a matrix of photo detectors, makes it possible to capture a larger number of light rays diffracted by the particles.

Indeed, the matrix of photo detectors can receive on the one hand the light rays diffracted by the particles and which reach after diffraction directly on the matrix of photo detectors and on the other hand the rays that reach the matrix of photo detectors after reflection off the reflecting surface.

The invention thus makes it possible to increase the diffraction diagram to which there is access to.

Indeed, in the framework of the development of the present invention it was noticed that in a solution of the type of that described in document FR2963101 mentioned hereinabove, the photo detectors capture the diffracted light laterally and detect a solid angle of the diffraction which is very limited. This type of solution then makes it possible only to access a limited portion of the diffraction diagram which reduces the wealth of information available and limits the knowledge that can be had of the particles, in particular the nature thereof.

With the invention, the combination of the reflecting surface, of the matrix of photo detectors and of the substrate bearing the channel makes it possible to approximate to a two-dimensional measurement a three-dimensional diffraction.

The present invention thus allows for a projection on the same matrix of photodiodes of a very large number of light beams diffracted in varied directions in three-dimensions.

The geometry of the present invention allows for a projection of a vector space of three-dimensional propagation to a two-dimensional measuring space.

The invention thus makes it possible to collect information in a larger and more precise quantity concerning the particles. The detection of particles and the identification of the parameters thereof, such as the sizes or nature thereof, is therefore improved.

Particularly advantageously, the present invention allows for the determination of the index of refraction of particles.

Preferably, the matrix of photo detectors extends in a first plane and the reflecting surface extends in a second plane, said first and second planes being parallel to the principal plane (x, y) and situated on either side of said portion of the substrate.

In this way, the detector according to the invention is relatively simple to manufacture since all of the layers (matrix of photo detectors and reflecting layers) can be formed in parallel planes.

Moreover, the detector according to the invention makes it possible to project, by the intermediary of the reflecting surface, the image of the diffraction diagram on the matrix of photo detectors, with the latter possibly covering an extended surface area of which the size depends little or not at all on the shape and the dimension of the channel. The invention thus makes it possible to collect rays reflected off a large surface area, while still retaining a limited space, in particular a limited channel length and width.

The present invention also relates to a method for the production of at least one particle detector according to the present invention, comprising at least the following steps:

Supplying at least a first substrate comprising at least one matrix of photo detectors and a portion of at least one optical device configured to emit at least one luminous radiation, the first substrate extending in a principal plane (x, y) and, preferably, the matrix of photo detectors extending in a first plane parallel to said principal plane (x, y);

Supplying at least a second substrate comprising at least one reflecting layer able to reflect said at least one luminous radiation, the second substrate extending partially at least in the principal plane (x, y) and, preferably, and the reflecting layer extending in a second plane parallel to said principal plane (x, y);

Forming a third substrate by assembling the first substrate and the second substrate in such a way that the matrix of photo detectors and the reflecting surface are arranged on either side of a portion at least of the substrate;

Before and/or after the step of forming the third substrate, forming at least one channel for the circulation of particles extending principally along a direction (z) perpendicular to said principal plane (x, y) and passing entirely through the third substrate in such a way that, if particles are present in the channel, a portion at least of the luminous radiation emitted by the optical device passes through the channel by being diffracted at least partially by at least one particle, then is reflected at least partially off the reflecting surface, then arrives at least partially at the matrix of photo detectors.

Advantageously, in the case where the step of forming of the channel is carried out before the step of formation of the third substrate, the method comprises the following steps:

Forming of at least a first portion of the channel through the first substrate in the perpendicular direction (z) and located in the vicinity of the distal portion;

Forming of at least a second portion of the channel through the second substrate in said perpendicular direction (z);

Deposition of at least one additional reflecting layer, able to reflect said at least one luminous radiation, on at least one portion of the second portion of the channel and preferably on at least one wall of said at least one channel.

BRIEF DESCRIPTION OF THE FIGURES

The purposes, objects, as well as the characteristics and advantages of the invention shall appear better in the detailed description of embodiments of the latter which are shown by the following accompanying drawings wherein:

FIGS. 4a to 6d show the steps of carrying out a detector according to the present invention. More precisely:

FIGS. 4a to 4h show, according to an embodiment and according to a view according to the section A-A, the of formation of the extraction network on a first substrate comprising a matrix of photo detectors and at least the distal portion of the waveguide intended to include the extraction network.

FIGS. 6a to 6d show, according to the first embodiment and according to a view according to the section A-A, the assembly of the first and second substrates shown in FIGS. 4h and 5d as well as the formation of the channel for the circulation of particles.

FIG. 7a shows an optical path that passes through the channel directly at the outlet of the extraction network.

FIG. 7b shows an optical path that passes through the channel directly at the outlet of the extraction network after reflection off a reflecting surface.

FIGS. 8b and 8c are views along the section B-B of the detector according to FIG. 8a. These FIGS. 8b and 8c correspond to the view 7a and 7b applied to the embodiment of FIG. 8a.

FIGS. 9a and 9b show, according to an embodiment and according to a view along the section A-A, the steps of formation of the extraction network on a first substrate comprising a matrix of photo detectors and at least the distal portion of the waveguide as well as the formation of a first portion of the channel.

FIGS. 9c to 9e show, according to an embodiment and according to a view along the section A-A, the steps of forming a second substrate and of a second portion of the channel as well as the deposition of the upper reflecting layer.

FIG. 9f shows, according to an embodiment and according to a view according to the section A-A, the assembly of the first and second substrates.

FIG. 11 is a top view of an alternative of the embodiment of FIG. 10 wherein photo detectors are distributed over an entire substrate in such a way as to cover a larger detection surface area.

Figure 1A:
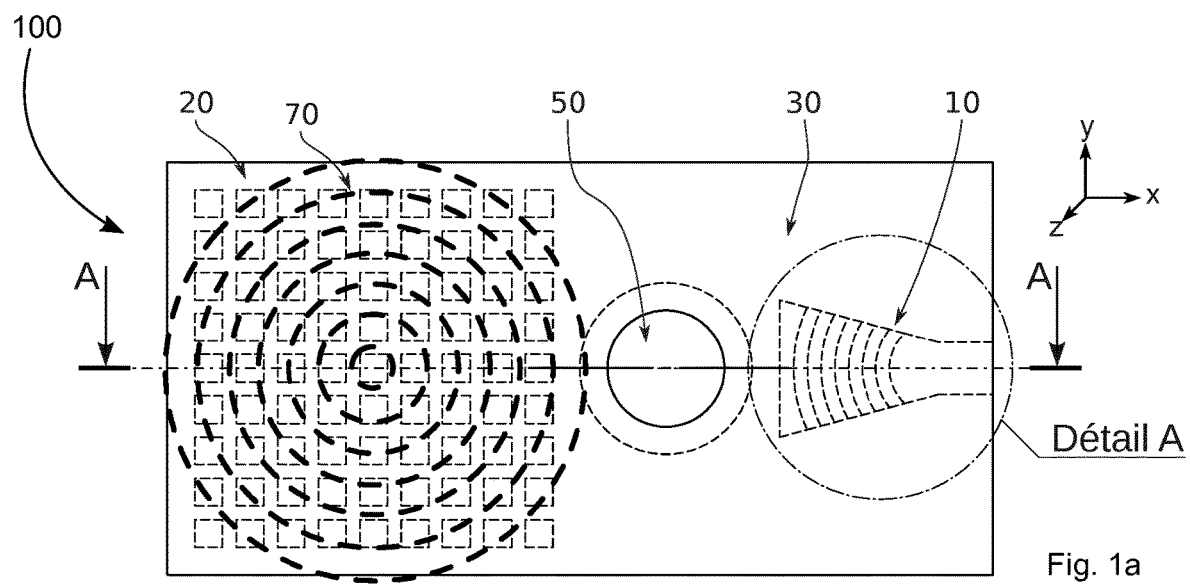
FIG. 1a is a top view of a particle detector according to a first embodiment of the present invention. In this figure, a projection of the diffraction diagram of light rays by particles is sketched. This figure shows a possible arrangement of a matrix of photo detectors with respect to a channel for the circulation of particles and to the distal portion of an optical device.

The attached drawings are given as examples and do not limit the invention. These drawings are diagrammatical representations and are not necessarily to the scale of the practical application. In particular the relative dimensions of the various layers, photo detectors and waveguide are not representative of reality.

DETAILED DESCRIPTION OF THE INVENTION

In the framework of the present invention, the term "on", "overmounts", "covers" or "underlying" or the equivalents thereof do not mean "in contact with". Thus for example, the deposition of a first layer on a second layer, does not necessarily mean that the two layers or substrates are directly in contact with one another but this means that the first layer covers at least partially the second layer by being either directly in contact with it or being separated from it by at least one other layer or at least one other element.

In the following description, similar reference numbers will be used to describe similar concepts through different embodiments of the invention.

Unless specifically mentioned otherwise, technical characteristics described in detail for a given embodiment can be combined with the technical characteristics described in the context of other embodiments described as an example an in a non-limiting way.

In the framework of the present invention, the term "particle", or the equivalents thereof have for definition a constituent of a physical system considered as elementary with respect to the properties studied. For example a particle is an element of material of which the largest dimension is less than the millimetre ($10^{-3}$ metres) and preferably at a few tens of micrometres ($10^{-6}$ metres) and preferably less than the micrometre, even of about a nanometre ($10^{-9}$ metres). Generally, these are objects composed of material of which the dimensions are small with respect to the dimensions of the channel for the circulation of particles.

Preferably in the framework of the present invention, the terms "luminous radiation", "wave" or "ray" or the equivalents thereof have for definition an electromagnetic flux that has a principal wavelength lambda or a mean wavelength lambda around the principal wavelength with a standard deviation preferably less than or about 20% for example and preferably propagating in a single principal direction or a mean direction around the principal direction with a standard deviation less than or about 10% for example. This direction of propagation is also called "optical path". In what follows, the terms "diffusion", "diffraction" or the equivalents thereof refer to the phenomenon by which a propagation medium produces a distribution, in many directions, of the energy of an electromagnetic wave, light for example.

In what follows, the term "transparency" or the equivalents thereof refer to the phenomenon of allowing a luminous radiation in a transparent material to propagate relatively. In the present description, a material is considered as transparent when it allows at least 50% of a luminous radiation to pass, preferably at least 75% and advantageously at least 90%.

Before beginning a detailed review of embodiments of the invention, mentioned hereinafter are optional characteristics that may be used in association or alternatively:

Advantageously, the optical device is situated at least partially between said first and second planes.

This makes it possible to optimise the effectiveness of the detection of the diffracted rays.

Advantageously, the substrate has a first face turned facing or arranged in contact with the reflecting surface and a second face, opposite the first face and turned facing or arranged in contact with the matrix of photo detectors.

Advantageously, the matrix of photo detectors and the reflecting surface are situated partially at least and preferably entirely, in line with one another in said perpendicular direction (z).

This makes it possible to effectively increase the quantity of diffracted light rays measured while still retaining a very limited space.

Advantageously, the particle detector according to the present invention is configured so that a portion at least of the luminous radiation is reflected by a portion at least of the reflecting surface before passing through the channel to be diffracted by at least one particle.

The use of a reflecting surface situated before the passing through of the channel by particles, for example located facing the outlet of the optical device such as a waveguide, allows the present invention to take advantage of the backscattered rays in addition to the diffracted light rays, increasing by as much the number of measurements and therefore the wealth of the information detected.

Advantageously, at least one portion of the luminous radiation, preferably at least 90% of the luminous radiation, preferably all of the luminous radiation, remains confined in the substrate, i.e. between the first plane and the second plane.

Advantageously, at least one portion of the luminous radiation, preferably at least 90% of the luminous radiation, preferably all of the luminous radiation, remains confined in the substrate, i.e. between the first face and the second face.

Advantageously, the substrate is formed from at least one material allowing at least 50%, preferably at least 75% and preferably at least 90% of said luminous radiation to pass, preferably the substrate comprises a material that is transparent relatively to the luminous radiation.

Advantageously, the optical device has a distal portion through which the luminous radiation is emitted, the distal portion and the matrix of photo detectors are situated on either side of the channel with respect to said perpendicular direction (z).

This makes it possible to increase the quantity of diffracted light rays received by the matrix of photo detectors.

Advantageously, the optical device and the matrix of photo detectors are arranged in the substrate.

Advantageously, the optical device and the matrix of photo detectors are arranged outside of the at least one channel.

Advantageously, the optical device and the matrix of photo detectors are arranged in the substrate and outside of the at least one channel, in such a way as to be protected from a direct contact with the fluid comprising particles.

This makes it possible to limit and even suppress a fouling of the optical device and of the matrix of photo detectors by the particles of the fluid.

Consequently, the invention makes it possible to extend over time the performance of the detector.

Furthermore, the invention makes it possible to limit the maintenance operations to be carried out on the detector.

Advantageously, the matrix of photo detectors extends around, preferably entirely around, the channel.

According to this embodiment, the matrix extends over 360° around the channel.

This makes it possible to maximise the quantity of diffracted light rays received by the matrix of photo detectors.

The positioning of the photo detectors under the waveguide also makes it possible to arrange blind photo detectors that make it possible to virtually determine the relative position of the other photo detectors and therefore to virtually know the geometry of the detector. Moreover, this makes it possible to facilitate the positioning of the optical device by reducing the positioning constraints.

More generally, the matrix of photo detectors extends around the channel by covering an arc of circle of at least 180° and preferably 250° and preferably 300°.

Advantageously, at least one portion of the reflecting surface is carried by at least one portion of the wall of the channel.

Advantageously, the substrate comprises at least a first substrate and a second substrate, the first substrate bearing the matrix of photo detectors and preferably a portion at least of the optical device and the second substrate bearing at least the reflecting surface, preferably the first substrate being configured to ensure a detection function of the diffracted luminous radiation and the second substrate being configured to ensure at least partially a reflecting function of the diffracted luminous radiation in the direction of the matrix of photo detectors.

Advantageously, the substrate comprises at least a first substrate and a second substrate, the first substrate bearing at least a first portion of the channel and the second substrate bearing at least a second portion of the channel, each portion extending in said perpendicular direction (z), the average surface area of the section of the first portion is substantially less than or equal to the average surface area of the section of the second portion, the average surface area of the section of a portion corresponding to the mean of the surfaces takes as a whole of the height along the direction (z).

According to an embodiment, the mean thickness of the first portion is substantially less than or equal to the mean thickness of the second portion, the thicknesses being measured in said perpendicular direction (z).

Advantageously, the substrate is a single-layer substrate.

Alternatively, the substrate is a multi-layer substrate.

Advantageously, the optical device is formed in said substrate.

Advantageously, the reflecting surface covers the entire substrate.

Advantageously, the matrix of photo detectors and the reflecting surface are offset along the perpendicular direction (z).

This makes it possible to have a space, preferably comprising a material transparent to the luminous radiation, in which certain diffracted light rays can propagate until reaching the matrix of photo detectors directly or after reflection off the reflecting surface.

Advantageously, the luminous radiation is a monochromatic radiation.

This makes it possible to accurately know the wavelength of the luminous radiation received by the photo detectors in order to accurately design the present detector in order to increase the sensitivity thereof through the choice of the materials and of the geometry thereof.

Advantageously, the optical device comprises at least one waveguide, carried by the substrate, configured to guide the luminous radiation in the direction of the channel.

This makes it possible to arrange a source of luminous radiation at a distance from the channel. The waveguide makes it possible to bring as close as possible to the channel the luminous radiation and preferably while conforming it to the needs of detection.

Advantageously, the optical device comprises at least one distal portion shaped to form, at the outlet of the optical device an extraction network configured to generate a set of extracted light rays, preferably parallel with one another, at the outlet of the optical device, the extraction network has a shape that flares in the principal plane (x, y) in the direction of the channel.

Advantageously, the extraction network comprises a plurality of elliptical grooves, each groove being an extraction groove of a portion at least of the luminous radiation.

Advantageously, the extraction network comprises at least one plurality of elliptical grooves and the plurality of grooves forms an alternation of trenches and protrusions.

This makes it possible to choose during the design of the waveguide the extraction length and therefore the dimension of the extracted beam carrying the extracted light rays, as well as the divergence of the beam extracted. Indeed, the thickness of the etching determines the morphology of the extraction grooves and, through the same, the dimensions of the beam extracted.

When the etching is partial, the extracted beam is wide, and not very divergent, therefore comprised of extracted light rays that substantially have the same vertical deviation corresponding to the angle $\alpha$.

When the etching is deep, the extracted beam is narrow spatially, therefore divergent, therefore comprised of extracted light rays having vertical deviations that vary around the value of the angle $\alpha$.

This elliptical aspect makes it possible to follow the profile of the wavefront of the luminous radiation during the propagation thereof in said distal portion.

Advantageously, the optical device comprises at least one waveguide comprising a core that has a distal portion and a sheath covering the core, the core having, on the distal portion, a plurality of grooves of a lower thickness than the rest of the distal portion arranged periodically according to a pitch P such that P satisfies the following expression:

$$\frac{\lambda}{n_{eff}} \leq P \leq \frac{\lambda}{n_{eff} - n_g}.$$

With: λ the wavelength of the luminous radiation;
$n_{eff}$ the effective index of refraction of the fundamental mode of the luminous radiation;
$n_c$ the index of refraction of the core of the waveguide;
$n_g$ the index of refraction of the sheath of the waveguide;
$n_{eff}$ being between $n_c$ and $n_g$.

This makes it possible to obtain an extraction of the luminous radiation from the extraction network according to a direction of propagation making an angle α between the plane (x, y) wherein the waveguide extends principally and the principal direction of extension of the channel (z) with preferably α between 0 and 90°.

The luminous radiation propagating in the waveguide forms an angle α with the principal plane (x, y), with 0°≤α≤90°, preferably 10°≤α≤45° and preferably 20°≤α≤40° and preferably 20°≤α≤30° and preferably α about equal to 25°. These values allow for an effective detection of the non-diffracted light rays while still retaining low parasitism, that can also be designated by low interference.

Advantageously, the optical device comprises at least one waveguide, the waveguide being monomode.

Advantageously, the optical device comprises at least one waveguide comprising a core and a sheath, the thickness h of the waveguide measured in said perpendicular direction (z) is such that:

$$h \leq \frac{2\lambda}{\pi\sqrt{n_c^2 - n_g^2}}$$

With: λ the wavelength of the luminous radiation;
$n_c$ the index of refraction of the core of the waveguide;
$n_g$ the index of refraction of the sheath of the waveguide.

This makes it possible to have a monomode guide and to control with precision the direction of extraction by the extraction network of the luminous radiation, i.e. the principal direction of propagation of the extracted light rays.

Advantageously, the present invention comprises at least a first channel for the circulation of particles and at least a second channel for the circulation of particles.

Advantageously, the present invention comprises at least a first channel and a second channel for the circulation of particles, each channel being intended to receive the fluid comprising particles and being configured to receive a portion at least of the luminous radiation emitted by the optical device.

Advantageously, the present invention is configured in such a way that the luminous radiation received by each channel comes from a single optical device and preferably from a single light source.

Advantageously, the matrix of photo detectors and the reflecting surface are arranged on either side of said portion of the substrate in such a way that a portion at least of the luminous radiation emitted by the optical device passes through each one of the channels or at least one of the channels by being diffracted by at least one particle, then reflects off the reflecting surface, then reaches the matrix of photo detectors.

This embodiment allows for good detection even if one of the channels is out of order, for example if it is clogged, typically by dust or large particles such as insects. This embodiment thus makes it possible to improve the reliability of the detection.

Advantageously, the optical device comprises at least one waveguide comprising at least one junction configured to form at least a first arm of the waveguide and at least a second arm of the waveguide. According to an embodiment, the detector is configured so that:
a portion at least of the luminous radiation emitted by the optical device through the first arm of the waveguide passes through the first channel by being diffracted by at least one particle, then is reflected off the reflecting surface, then reaches the matrix of photo detectors;
a portion at least of the luminous radiation emitted by the optical device through the second arm of the waveguide passes through the second channel by being diffracted by at least one particle, then is reflected off the reflecting surface, then reaches the matrix of photo detectors.

The present invention has for preferred field of application the detection of particles of various sizes, preferably in the field of microscopic and even nanometric particles.

For example the present invention can be used for the detection of particles coming from smoke, particles of dust, polluting particles or particles coming from allergens such as pollens, mould spores, or carcinogenic particles, or biological particles such as bacteria, viruses, or exosomes.

The present invention applies to all types of particles conveyed by a fluid, whether the fluid is liquid and/or gaseous.

In the following description, details will be provided on the present invention in reference to several embodiments that can be combined as needed and which each have a plurality of alternatives.

A first embodiment of the invention shall now be described in reference to FIGS. 1a and 1b.

FIG. 1a shows a top view of a substrate 100 comprising a reflecting surface 41, a distal portion 10 of an optical device 15, a channel 50 for the circulation of particles 60 and a matrix 20 of photo detectors 21.

In this figure, a schematisation of the diffraction diagram 70 of rays diffracted by particles is shown.

Figure 1B:
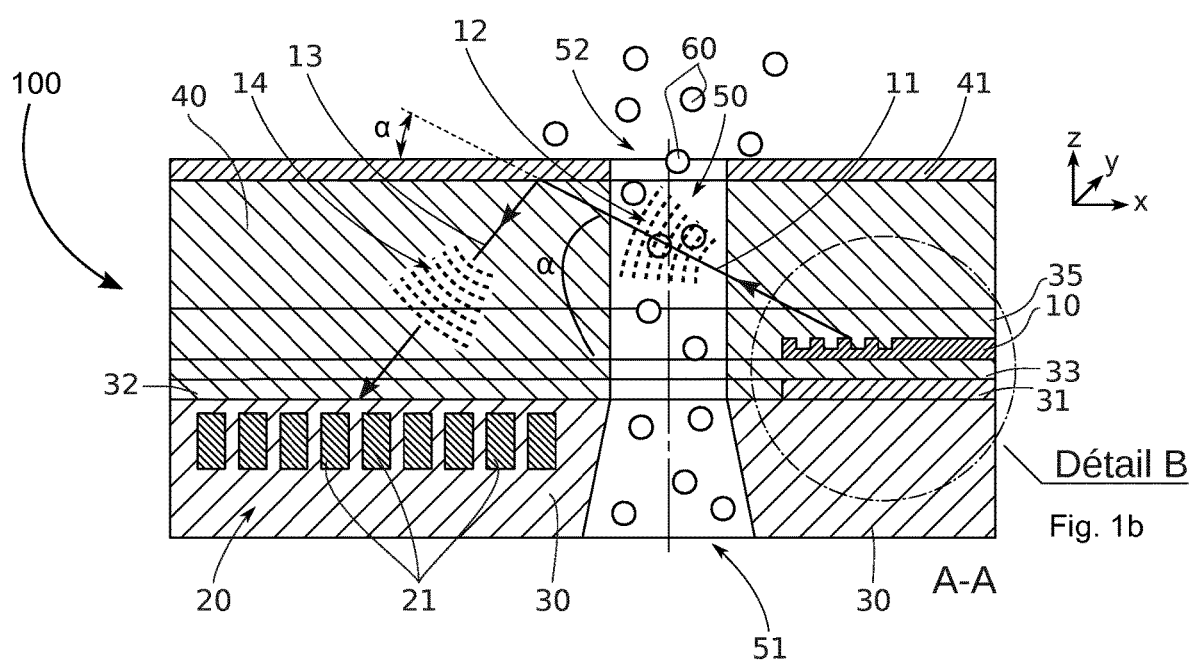
FIG. 1b shows a view according to the section A-A of FIG. 1a. In this figure, the optical path of extracted light rays from an extraction network is shown. This optical path encounters the flux of particles in the channel for the circulation of particles then forming diffracted light beams shown diagrammatically in this figure. The reflections of the extracted light rays and of the light rays diffracted by an upper reflecting layer are also shown.

FIG. 1b shows a view of the substrate 100 according to the section A-A shown in FIG. 1a.

As shown in these two figures, the reflecting layer 41 is arranged preferably in line with the matrix 20 of photo detectors 21.

Advantageously, the channel 50 for the circulation of particles 60 is arranged between the distal portion 10 of the optical device 15 and a portion at least of the matrix 20 of photo detectors 21.

The disposition relative of the reflecting layer 41, of the matrix 20 of photo detectors 21 and of the distal portion 10 of the optical device 15 is configured in such a way that, when particles 60 are present in the channel 50, the extracted light rays 11 from the optical device 15 pass through the channel 50 by being diffracted at least partially by at least one particle 60 in such a way as to produce diffracted light rays 12. The extracted 11 and diffracted 12 light rays are then at least partially reflected off the reflecting layer 41 in such a way as to produce reflected extracted light rays 13 and reflected diffracted light rays 14 reaching the matrix 20 of photo detectors 21.

In an advantageous and non-limiting manner, the substrate 100 comprises at least a first substrate 30 and at least a second substrate 40.

According to a preferred embodiment, the first substrate 30 and the second substrate 40 are made integral, for example via molecular bonding, in such a way as to form the substrate 100. In this case, the substrate 100 can thus be qualified as an assembly substrate or as a "third substrate" obtained by assembly of the first 30 and second 40 substrates.

Preferably, the matrix 20 of photo detectors 21 is carried by the first substrate 30.

The matrix 20 of photo detectors 21 is advantageously protected from a direct contact with the fluid comprising particles 60, in such a way as to limit the fouling thereof by said particles. The matrix 20 of photo detectors 21 is in particular situated outside of the channel 50. According to an embodiment the matrix 20 of photo detectors 21 can be arranged in or encapsulated by the substrate 100. This makes it possible to extend over time the performance of the matrix 20 of photo detectors 21 and therefore of the detector. Moreover, the maintenance operations to be carried out on this detector are reduced with respect to the detectors in which the photo detectors are potentially in contact with a fluid comprising particles.

The invention therefore makes it possible to limit the maintenance operations to be carried out.

Advantageously, the first substrate 30 carries a portion at least of the optical device 15. The latter comprises at least one waveguide having a distal portion 10. The waveguide advantageously comprises a core and a sheath.

Preferably the core of the waveguide comprises at least one material with a nitride base. The sheath of the waveguide preferably comprises at least one material with a silica base, with the material preferably forming the base material of the substrate 30. This waveguide is configured to convey as close as possible to the channel 50 the luminous radiation emitted by the optical device 15.

The distal portion 10 of the waveguide, and preferably the optical device 15, are protected from a direct contact with the fluid comprising particles 60, in such a way as to limit the fouling thereof by said particles. The distal portion 10 and/or a portion at least of the device 15 comprising the distal portion 10 are therefore situated outside of the channel 50. According to an advantageous embodiment, they can be arranged in or encapsulated by the substrate 100.

This makes it possible to extend over time the transmission effectiveness of the optical device and therefore of the detector.

This waveguide is advantageously situated in the principal plane (x, y) wherein the substrate 100 extends, the location x, y, z being shown in FIGS. 1a and 1b.

The waveguide is preferably located between a first plane on which is arranged the matrix 20 of photo detectors 21, with this first plane being preferably parallel to the plane (x, y), and a second plane on which is arranged the reflecting surface 41, with this second plane being parallel to the first plane.

According to an embodiment, the first plane contains the matrix 20 of photo detectors 21.

According to an embodiment, the second plane contains the at least one reflecting surface 41.

According to an embodiment, the channel 50 for the circulation of particles 60 has a principal direction of circulation extending according to the direction z perpendicular to the principal plane (x, y).

This channel 50 of circulation extends from an inlet orifice 51 to an outlet orifice 52.

According to a preferred embodiment, the channel 50 for the circulation of particles 60 is positioned between the distal portion 10 of the waveguide and the matrix 20 of photo detectors 21. In this position, the matrix 20 of photo detectors 21 receives most of the diffracted light rays 12 and 14.

According to another embodiment, the matrix 20 of photo detectors 21 can also be arranged around the distal portion 10 of the waveguide in such a way as to also receive the backscattered rays, not shown in FIG. 1b, i.e. diffracted according to a direction substantially opposite the principal direction of extraction of the extracted light rays 11.

Indeed, particles 60 of large size, with respect to the wavelength of the extracted light rays 11, can backscatter the extracted light rays 11, i.e. produce diffracted light rays in the opposite direction of the propagation of the incident rays.

Figure 2A:
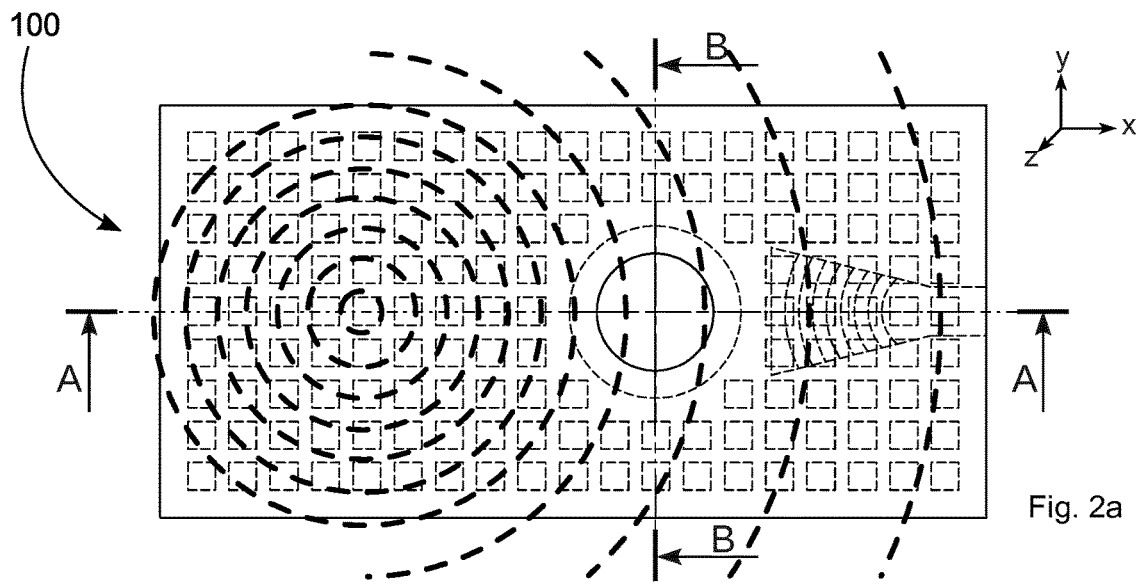
FIG. 2a is a top view, similar to the view of FIG. 1a, but according to an alternative of the embodiment of FIG. 1a wherein photo detectors are distributed over an entire substrate so as to cover a larger detection surface area.
Figure 2B:
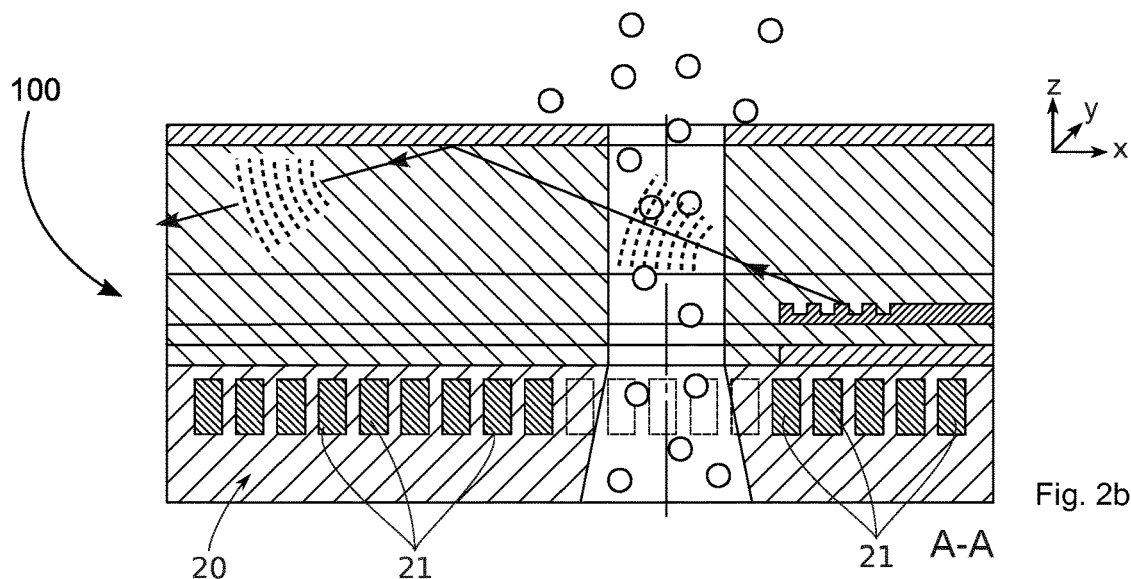
FIG. 2b is a view according to the section A-A of FIG. 2a. In this figure, identically to FIG. 1b, are sketched the optical paths of extracted light rays from an extraction network located on a distal portion of a waveguide, as well as those of diffracted and reflected light rays.
Figure 2C:
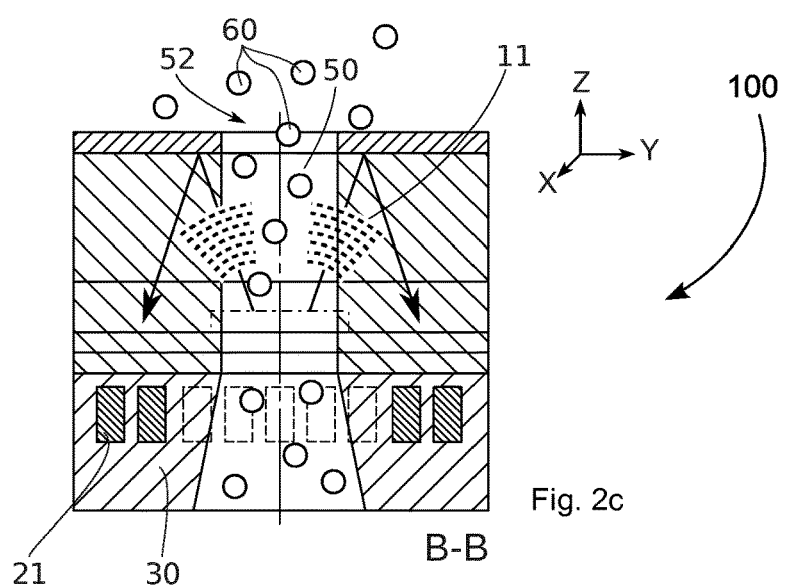
FIG. 2c is a view according to the section B-B of FIG. 2a. In this figure, identically to FIG. 2b, are sketched the optical paths of extracted light rays from the extraction network, as well as those of diffracted and reflected light rays.

According to another embodiment, the matrix 20 of photo detectors 21 can be positioned all around the channel 50 for the circulation of particles 60 as shown through FIGS. 2a and 2b and this in such a way as to extend the detection zone of the diffracted light rays 12 and 14 and of the backscattered rays. This makes it possible to have a larger detection surface area and to measure the diffraction diagram 70 as a whole. FIG. 2b shows, along the section B-B of FIG. 2a, the diffracted light rays 12 propagating in multiple directions all around the principal direction (z) of extension of the channel 50.

The optical device 15 in reference in particular to FIGS. 3a and 3b shall now be described in more detail.

According to a preferred embodiment, the optical device 15 is able to be connected to at least one light source. For example, this light source can be a light-emitting diode or a laser diode.

According to a non-limited example, the present detector can be designed so as to use the light source of a portable device such as a lighting, preferably monochromatic, of a mobile telephone of the smartphone type for example, so as to have a portable particle detector module. This application thus makes it possible for example to conduct air quality analyses.

According to an embodiment, the optical device 15 comprises at least one light source of a luminous radiation and a waveguide comprising a distal portion 10 configured to generate light rays 11 from the waveguide.

Preferably, the waveguide is configured to allow for the propagation of the luminous radiation from the optical device 15 to the channel 50 for the circulation of particles 60.

Advantageously, the distal portion 10 comprises a lateral extension extending in the principal plane (x, y) and widening in the direction of the channel 50.

Preferably, the maximum dimension of this lateral extension, prise according to the y axis, is less than or substantially equal to the maximum dimension of the channel 50 prise according to this same direction. Typically, the width D of the distal portion 10 is less than or equal to the diameter of the channel 50.

This advantageously makes it possible to maximise the number of particles 60 illuminated by the extracted light rays 11 while still preventing extracted light rays 11 from being emitted according to directions that do not pass through the channel 50 for the circulation of particles 60.

According to a preferred embodiment, this distal portion 10 comprises an extraction network 10a of light rays. This extraction network 10a can have a series of ridges and troughs according to a certain periodicity P, as shall be described in detail in what follows.

The luminous radiation propagating in the waveguide is extracted from the extraction network 10a by borrowing a principal direction of extraction forming an angle α with the principal plane (x, y). This angle α is illustrated in FIG. 1b.

This principal direction of extraction is advantageously located between a normal direction and an incident direction relatively to the principal plane (x, y). In this latter case, α=0, according to this configuration, a substantial portion, even all of it, of the particles 60 circulating in the channel 50 is illuminated by the extracted light rays 11.

According to another configuration, the angle α can be greater than or equal to 45°, preferably to 75° and advantageously to 85°. Particularly advantageously, it is possible to provide that the angle of extraction a, is such that the extracted light rays 11 exit via the outlet orifice 52 of the channel 50. In this case, the matrix 20 of photodiodes 21 detects only the diffracted light rays 12 and 14 by the particles 60, it does not detect the non-diffracted light rays emitted by the optical device 15.

In the case where the value of the angle α allows for the detection of non-diffracted light rays emitted by the optical device 15, this then makes it possible to follow the derivative of the power of the light source over time, corresponding to the ageing of this light source, or to the fouling of the channel over time. The analysis of this derivative can then make it possible to not make an error on the ratio between the quantity of diffracted light and the quantity of light emitted by the light source. This ratio is indeed a magnitude that is often useful to feed back to certain particle parameters such as their nature or their concentration.

However, in this same case, the non-diffracted light waves emitted by the optical device 15 can act as a source of parasitic light with respect to the detection by the matrix 20 of photodiodes 21 of the diffracted light waves 12 and 14.

During the development of the present invention, it was surprisingly revealed that when the angle α has a value close to 25°, the detection of the non-diffracted light rays is effective while still retaining low parasitism, that can also be designated by low interference.

Advantageously, the extracted light rays 11 are diffracted by the particles 60. A portion at least of the diffracted light rays 12 is reflected off the reflecting layer 41, preferably metallic, located at least partially facing the matrix 20 of photo detectors 21, the diffraction diagram 70 is thus substantially projected in its entirety on the matrix 20 of photo detectors 21.

Indeed, on the one hand the matrix 20 receives a portion of the diffraction diagram 70 directly from the particles and on the other hand it receives an additional portion of the diffraction diagram 70 after reflection of the diffracted light rays 12 off the reflecting layer 41.

In addition, the present invention can be adapted according to the type of particles to be detected, whether from a standpoint of materials, geometry or on luminous radiation itself. Thus, the present invention makes it possible to adapt the luminous radiation to various fields of application.

According to an embodiment, the radiation comprises a wavelength suitable for the needs of detection, for example less than the principal dimension of the particles to be measured.

According to a preferred embodiment, the first substrate 30 has a principal function of detection and the second substrate 40 has a principal function of transparency and of a mirror.

Preferably, the first substrate 30 comprises silicon and the second substrate 40 comprises, according to an embodiment at least one material that is transparent relatively to the luminous radiation in such a way as to allow the luminous radiation, the extracted light rays 11 and 13 and the diffracted light rays 12 and 14 to pass through it.

The second substrate 40 can include silicon oxide, i.e. be for example made of glass.

Particularly advantageously, the reflecting layer 41, is arranged on the upper surface of the second substrate 40 opposite the lower surface of the second substrate 40 located facing or in contact with the first substrate 30.

In the case of this first embodiment, the reflected diffracted light rays 14 pass through the second substrate 40 before reaching the photo detectors 21.

In a clever manner, the index of refraction of the second substrate 40, made of glass for example, is configured to be close that that of the air. In this situation, there is very little reflection at the interfaces between the inside of the channel 50 and the second substrate 40, i.e. on the walls of the channel 50.

According to an embodiment, an antireflection layer can be deposited on the walls of the channel after the realisation of the latter so as to reduce or even prevent reflections on the interfaces between the inside of the channel 50 and the second substrate 40.

Using a reflecting layer 41 referred to as "mirror" on the upper face of the second substrate 40 makes it possible to project the image of the diffraction diagram 70 on the matrix 20 of photo detectors 21 situated on the surface of the first substrate 30.

The present invention thus makes it possible to obtain a larger quantity of information concerning the diffraction diagram 70, even the complete diffraction diagram 70 of the particles 60, via the use and the clever positioning of a reflecting layer 41 and of a matrix 20 of photo detectors 21.

Figure 3A:
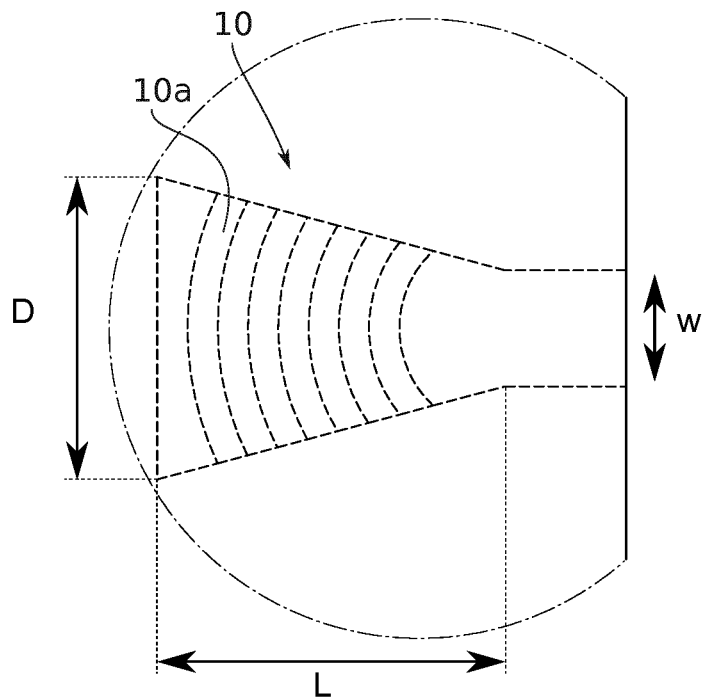
FIG. 3a is a view of the detail A of FIG. 1a. This is a top view of an example of the extraction network and of its dimensions.
Figure 3B:
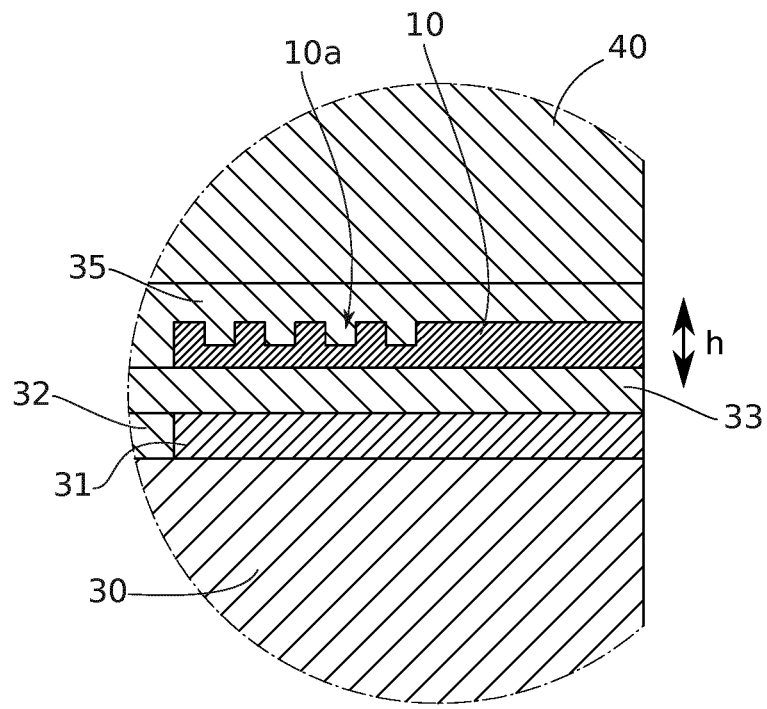
FIG. 3b is a view of the detail B of FIG. 1b. This is a cross-section view of the extraction network, this section being taken on the distal portion of the waveguide.

FIGS. 3a and 3b show a possible geometry of the distal portion 10 of the waveguide comprising the extraction network 10a.

The waveguide comprises a second end opposite the first end. This second end has a dimension w, taken along the axis y. Preferably, w is less than D.

The distal portion 10 of the waveguide has an extension length L taken along the direction x and corresponding substantially to the length of the extraction network 10a.

So that the beam constituted by the extracted light rays 11 reaches a dimension substantially equal to D over a very short propagation distance, it is suitable that for a given dimension D, L be as small as w is small. Mathematically, the relation between L, D and w can be expressed approximately as follows:

$$L \approx D * w * \frac{n_c \sqrt{n_c^2 - n_g^2}}{\lambda}$$

This then allows the distal portion 10 of the waveguide to have a very large divergence in the principal plane (x, y). The enlargement coefficient of the distal portion 10 is then substantial. This configuration thus makes it possible that over a very short distance, the extracted light rays 11 together have a spatial extension substantially equal to D and preferably substantially equal to the diameter of the channel 50. This configuration thus increases the compactness of the present invention. Those skilled in the art, with the known electromagnetic tools, will know how to dimension L, w and the extraction network 10a, according to D, so as to obtain this effect of compactness.

According to an embodiment, so as to be able to control the principal direction of extraction of the extracted light rays 11 by the extraction network 10a, the waveguide is preferably designed in such a way that it is monomode with respect to the luminous radiation. The thickness h of the waveguide, taken along the direction z, is because of this relatively low compared to the wavelength λ of the luminous radiation.

In the case where the section of the waveguide is substantially square, then the thickness h of the waveguide is such that:

$$h \leq \frac{2\lambda}{\pi\sqrt{n_c^2 - n_g^2}}$$

with:
$n_c$: index of refraction of the core
$n_g$: index of refraction of the sheath.

In the case of a core made of nitride and a sheath made of silica, the respective indexes of refraction are $n_c=2$ and $n_g=1.5$ for a luminous radiation located in the domain of the visible wavelengths, which gives for the thickness h, the following expression:

$$h \leq \frac{\lambda}{2}$$

It can be noted that the effective index of refraction $n_{eff}$ of the fundamental mode of the luminous radiation can be calculated on the basis of electromagnetism calculations and is between the index of refraction of the core $n_c$ and that of the sheath $n_g$.

FIG. 3b is a view of the detail B of FIG. 1b. The extraction network 10a comprises a series of troughs and ridges of which the periodicity is noted as P.

This extraction network 10a is carried out by etching, partial or complete, of the distal portion 10 of the waveguide.

During the development of the present invention it was observed that the type of etching used directly influences the extraction width and therefore influence the size of the beam carrying the extracted light rays 11 and the divergence of the extracted light rays 11.

It is suitable for example to use a partial etching if it is desired to reduce the divergence of the extracted light rays 11.

The choice of the periodicity P directly impacts the principal direction of extraction of the extracted light rays 11, i.e. the angle α defined hereinabove. As indicated hereinabove, this principal direction of extraction can be between a normal direction (α=90°) and a direction referred to as incident (α=0°) and can be expressed as follows:

$$\frac{\lambda}{n_{eff}} \leq P \leq \frac{\lambda}{n_{eff} - n_g}$$

The choice of P directly determines the angle of extraction of the extracted light rays 11.

$$P = \frac{\lambda}{n_{eff} - n_g \cos\alpha}$$

As shown in FIG. 3b, a lower reflecting layer 31 can be arranged under at least the distal portion 10 of the waveguide. This lower reflecting layer 31, preferably made of metal, for example aluminium or copper, is arranged at an optical distance of the waveguide being advantageously equal to at least one quarter of the wavelength of the luminous radiation. This optical distance corresponds advantageously to a distance, referred to as "physical", greater than λ/(4n), where n is the index of refraction of the material situated between the waveguide and the lower reflecting layer 31. This minimum distance ensures that the reflecting layer does not excessively disturb the ray in the guide and that it serves to send the extracted light upwards. This condition on this thickness makes it possible to increase the flux of radiation in the direction of the channel 50.

Notably, the present invention revealed that when the wavelength of the luminous radiation used is less than 600 nm, the aluminium has better reflectivity than copper for example.

When the wavelength of the luminous radiation used is greater than 600 nm, copper has a better reflectivity than aluminium.

Through FIGS. 4 to 6, an example of a method for producing at least one particle detector according to the first embodiment presented hereinabove shall now be described.

This method comprises in a simplified manner the following steps:
- the realisation of the waveguide on the first substrate 30 comprising beforehand the matrix 20 of photo detectors 21;
- the depositing of a reflecting layer 41 on the second substrate 40 preferably made of glass;
- the second substrate 40 is then glued on the first substrate 30 in such a way that the matrix 20 of photo detectors 21 and the reflecting surface 41 are arranged at a distance from one another and on either side of a portion of the substrate 40;
- then, the channel 50 for the circulation of particles 60 is formed through the first and second substrates 30 and 40. This formation of the channel 50 can for example be carried out via dry or wet etching.

Details on these steps are provided herein below.
FIGS. 4a to 4h show an embodiment of the first substrate 30 according to the present invention.

Figure 4A:
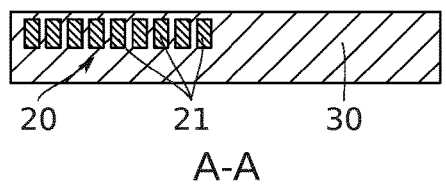

In the FIG. 4a, the first substrate 30 comprises a matrix 20 of photo detectors 21. Preferably the first substrate 30 is made of silicon.

According to a preferred embodiment, the matrix 20 of photo detectors 21 comprises an antireflection layer, not shown, arranged on the surface of the photo detectors 21 configured to limit the reflection of the rays reaching the matrix of photo detectors 21.

Figure 4B:
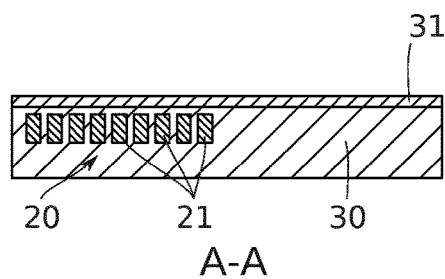

FIG. 4b shows the optional deposition of a lower reflecting layer 31, able to reflect the luminous radiation emitted by the optical device. Preferably this lower reflecting layer 31 comprises at least one metal such as for example aluminium or copper.

Figure 4C:
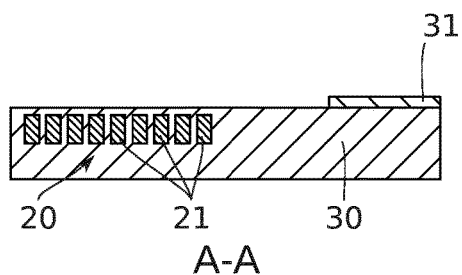

FIG. 4c shows the etching of a portion of the lower reflecting layer 31 in such a way as to expose a portion at least of the matrix 20 of photo detectors 21. This etching can be wet or dry. It can be preceded by conventional steps of lithography in order to select the zone to be etched.

Figure 4D:
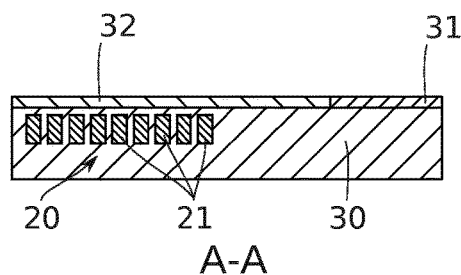

Once the lower reflecting layer 31 is structured, a first layer of oxide 32, of silicon for example, is deposited onto the surface of the first substrate 30 in such a way as to cover, after planarization via CMP (Chemical-Mechanical Planarization) for example, only the portion of the surface of the first substrate 30 that is not covered by the lower reflecting layer 31, such as shown in FIG. 4d.

According to an embodiment, these preceding steps can be replaced with a damascene with a copper and silica base for example.

Figure 4E:
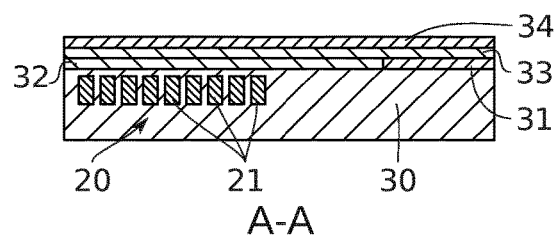

FIG. 4e shows the deposition of a buffer layer 33, of silica for example, over the entire surface of the first substrate 30 in such a way as to form a buffer layer 33 of which the optical thickness is at least one quarter of the wavelength of the luminous radiation. This optical thickness correspond advantageously to a thickness, referred to as "physical", at least equal to $\lambda/(4n)$, where n is the index of refraction of the buffer layer 33.

This buffer layer 33 provides the previously-described function of forcing the extracted light rays 11 to propagate according to a direction moving away from the surface of the first substrate 30.

Then, a guide layer 34 is deposited on the entire buffer layer 33 in such a way as to form, after etching, the waveguide comprising the distal portion 10.

Advantageously, this guide layer 34 comprises a material with a nitride base.

Figure 4F:
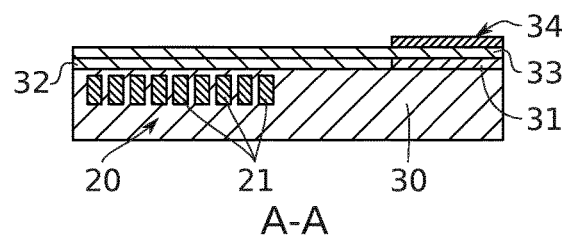
Figure 4G:
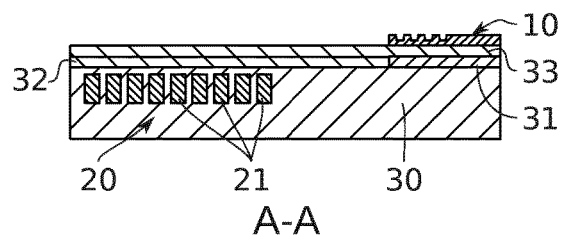

FIGS. 4f and 4e show the steps of the structuring of the guide layer 34 by partial or complete etching, in such a way as to form the extraction network 10a on the distal portion 10 of the waveguide.

Figure 4H:
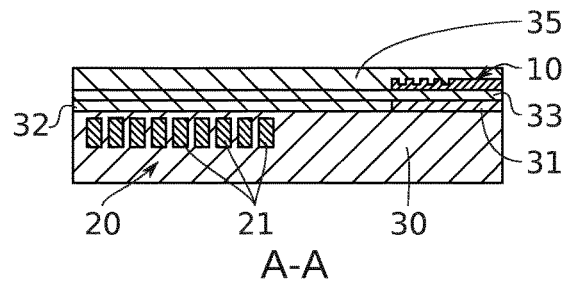
Figure 5A:
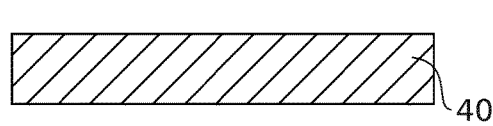
FIGS. 5a to 5d show, according to the first embodiment and according to a view according to the section A-A, the principal steps of formation of a second substrate and of the reflecting layer.
Figure 5B:
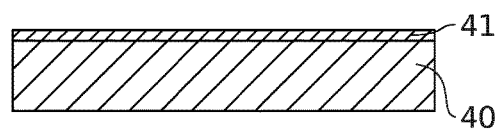
Figure 5C:
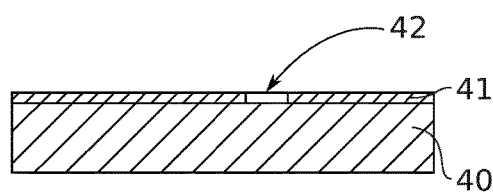
Figure 5D:
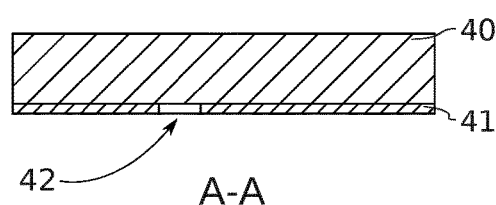
Figure 6A:
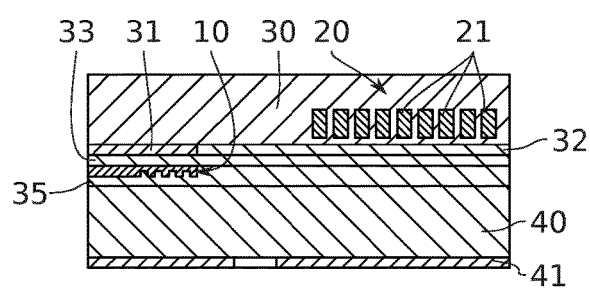
Figure 6B:
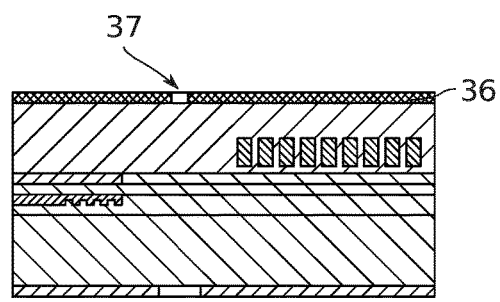
Figure 6C:
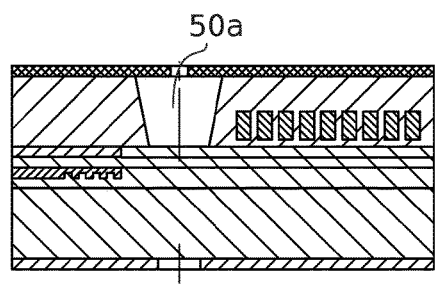
Figure 6D:
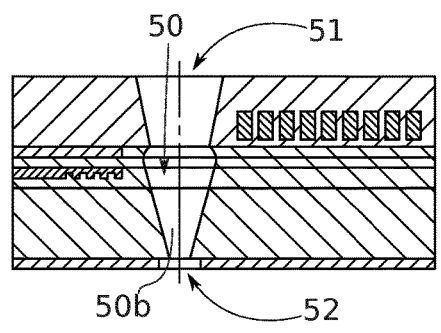

FIG. 4h then shows the deposition of a second layer of oxide 35, for example of silica, covering the entire surface of the first substrate 30.

A step of planarization via chemical mechanical polishing can for example be carried out in order to smooth the surface of the first substrate 30 thus formed by the preceding steps.

Before or after, or simultaneously to the preparation of the first substrate 30, the second substrate 40 is prepared.

For this and as shown in FIGS. 5a to 5d, the second substrate 40, preferably transparent to the luminous radiation considered, is covered on one of these principal surfaces, referred to as upper surface, by a reflecting layer 41, preferably with a metal base, such as aluminium or copper for example.

Optionally, once this deposition is carried out, a portion of the reflecting layer 41 is removed by lithography and etching in such a way as to expose a portion of the upper surface of the second substrate 40. This etching is configured to form an opening 42 for the future realisation of the channel 50 for the circulation of particles 60.

Then, as shown in FIGS. 6a to 6d, the substrate 100 is formed by the assembly of the first 30 and second 40 substrates. This assembly can comprise the gluing of the first 30 and second 40 substrates in such a way that the surface comprising the matrix 20 of photo detectors 21 and the waveguide of the first substrate 30 is put into contact with the lower surface of the second substrate 40 opposite the upper surface comprising the reflecting layer 41. In this configuration the upper reflecting layer 41 is, along the direction z, facing the matrix 20 of photo detectors 21 and of the waveguide through the second substrate 40.

Once this assembly is carried out, a step of formation of the channel 50 for the circulation of particles 60 is carried out through the substrate 100, i.e. through the first 30 and second substrates 40 and by passing substantially between the matrix 20 of photo detectors 21 and the extraction network.

This formation of the channel 50 can be carried out by a few conventional steps of lithography, and one or several etchings.

According to an embodiment, this etching can be an etching based on a chemistry comprising potassium hydroxide (KOH) or tetramethylammonium hydroxide (TMAH) and based on a chemistry comprising hydrofluoric acid (HF) for etching the second substrate 40 if the latter is made of glass for example.

For example, the first substrate 30 can be etched by using a chemistry based on KOH or TMAH if the latter is made from silicon for example and having beforehand undergone a deposition of a resin 36 in which an opening 37 is made, the opening 37 then being located at the location of the future inlet orifice 51 of the channel 50. This etching of the first substrate 30 thus allows for the formation of a first portion 50a of the channel 50.

The second substrate 40 can be etched thereon by using a chemistry comprising HF through for example the opening 42 made hereinabove. This etching of the second substrate 40 thus allows for the formation of a second portion 50b of the channel 50.

Advantageously, the etching with a KOH or TMAH base results in only a very low residual roughness since it is carried out according to the crystal planes of the silicon.

The HF etching generally generates a very low roughness, of about ten nanometres only.

However, a step after the deposition of a layer of silica on the etched surface of the second substrate 40 is possible so as to smooth the surface of the channel 50 for the circulation of particles 60.

A very low roughness on the surface of the channel 50 makes it possible to minimise, and even avoid, the presence of light rays diffracted by the walls of the channel 50, during the passage of the light rays from or to the channel 50.

Indeed, in order to satisfy the rigorous conditions of the detection of particles 60 by the measurement of a diffraction diagram 70, it is suitable to limit as much as possible the roughness of the walls inside the channel 50 for the circulation of particles 60.

This roughness, if it is too high, can induce a parasitic diffraction, or interference, referred to as background diffraction, measured by the photo detectors 21 even in the absence of particles 60 in the channel 50. A processing of the signals measured can make it possible to reduce this nuisance, however the precise choice of the etchings described here provides a very low roughness reducing the problems of parasitic diffraction by the channel 50 itself. The accuracy of the detection is thus improved.

Once the etching or etchings completed, the channel 50 for the circulation of particles 60 then passes through the substrate 100 entirely, allowing a flux of particles 60 conveyed by a fluid to circulate therethrough.

According to an alternative embodiment, the first and second portions 50a and 50b used to form the channel 50 can be formed before the step of disassembling the substrate 100.

According to another embodiment, a dry etching can be used, for example with an ion base, for the partial or complete forming of the channel 50.

Once of the many advantages of this first embodiment that uses a second transparent substrate 40 is a protection of the photo detectors 21.

Indeed, if the photo detectors are generally in direct contact with the particles, this can result in the formation of a deposition on the surface thereof which reduces their sensitivity and even blinds them.

According to this embodiment of this invention, the photo detectors 21 are protected by the presence of the second transparent substrate 40 situated directly in contact therewith.

Thus, the photo detectors 21 are protected while still receiving a larger quantity of light information via the phenomenon of reflection allowing for a better measurement of the diffraction diagram 70 of the particles 60 and therefore of their size and of their nature for example.

Indeed, based on the documents "The Mie Theory: Basics and Applications"; Wolfram Hergert, Thomas Wriedt; Springer, 30 Jun. 2012-259 pages, and "Light scattering and surface plasmons on small spherical particles", Xiaofeng Fan, Weitao Zheng and David J Singh, Light: Science & Applications (2014) 3 or J. R. Hodkinson and I. Greenleaves, "Computations of Light-Scattering and Extinction by Spheres According to Diffraction and Geometrical Optics, and Some Comparisons with the Mie Theory", Journal of the Optical Society of America 53, 577 (1963), it is known by those skilled in the art the determination of the size of a particle based on its diffraction diagram, a diagram that the present invention makes it possible to measure with very great precision.

As mentioned at the beginning of the description, the present invention comprises a second embodiment, entirely compatible with the first described hereinabove.

The advantages of the first embodiment can therefore be applied to the embodiment herein below.

Figure 7A:
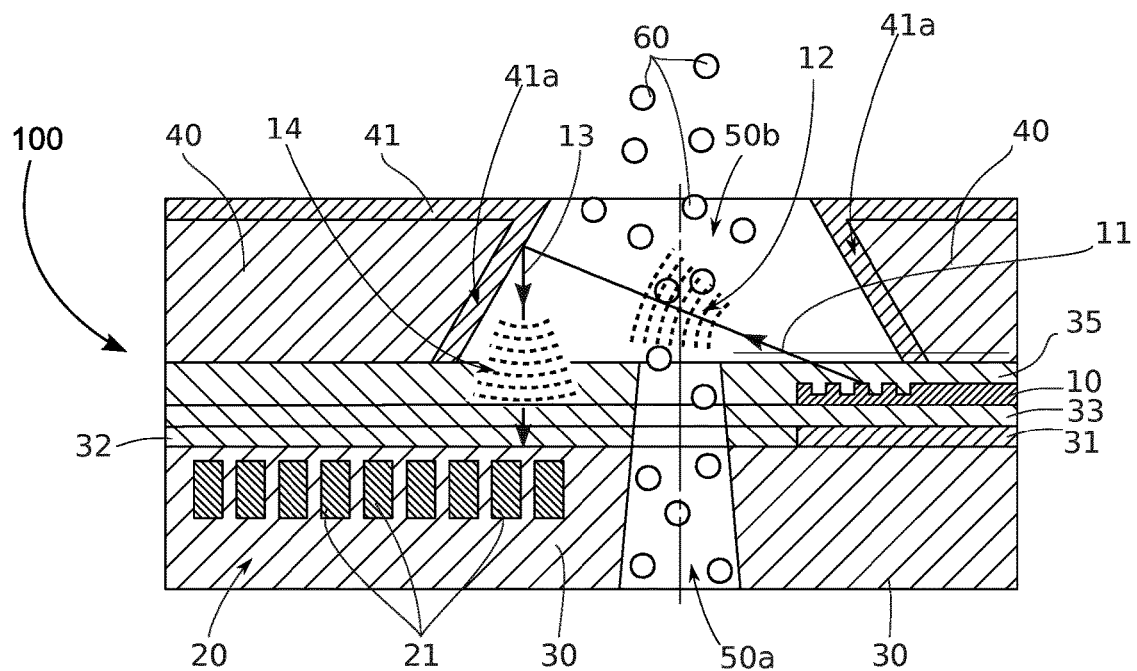
FIGS. 7a and 7b show, according to another embodiment, two views according to the section A-A cutting the channel for the circulation of particles.
Figure 7B:
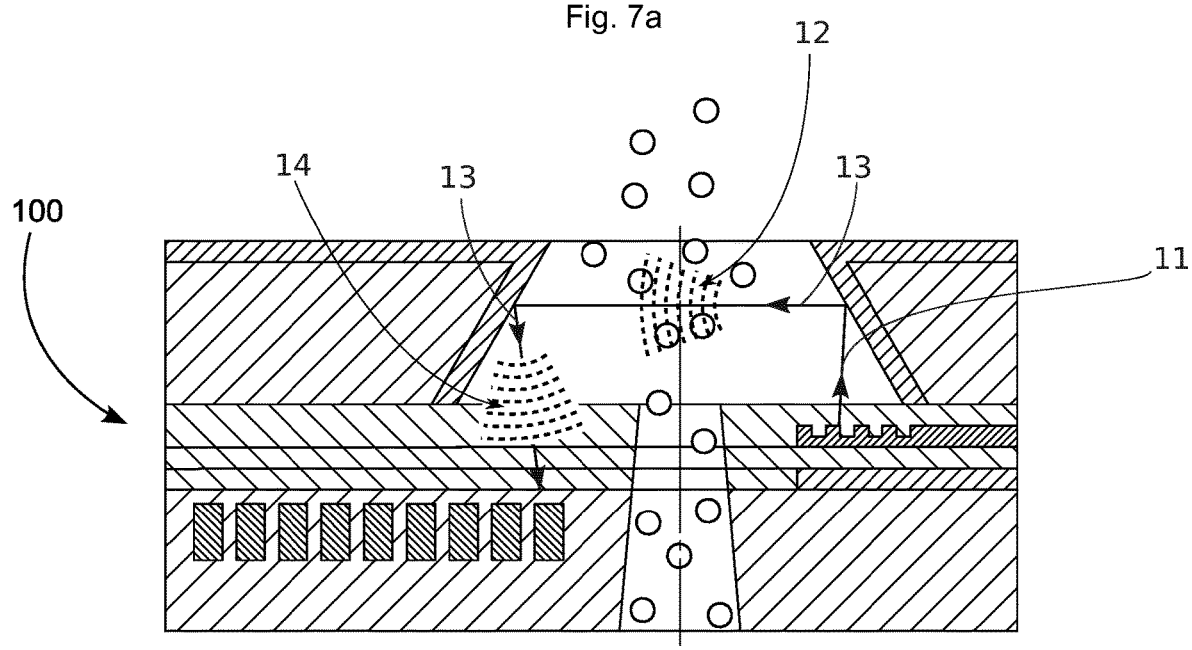

This second embodiment, shown in FIGS. 7a and 7b, is based on the use of a first substrate 30 identical to the one of the preceding first embodiment and of a second substrate 40 that can be substantially opaque to the luminous radiation.

According to the present embodiment, the transparent nature of the second substrate 40 with respect to the luminous radiation is not necessary.

FIGS. 7a and 7b show the substrate 100 resulting from the assembly of the first substrate 30 with the second substrate 40.

According to this second embodiment, the channel 50 passes through the first and second substrates 30 and 40. Preferably, the second substrate 40 is configured in such a way that the second portion 50b of the channel 50, the one passing through the second substrate 40, has a diameter greater than the diameter of the first portion 50a of the channel 50, the one passing through the first substrate 30.

In addition, the second portion 50b of the channel 50 comprises a diameter that diminishes as the channel 50 is directed, along the axis z, to the outlet orifice 52. This narrowing in the diameter makes it possible to form walls 41a that are inclined with respect to the principal plane (x, y).

These walls 41a are advantageously covered with a reflecting layer 41, preferably similar to that of the first embodiment.

Through this particular inclination of these reflecting surfaces, a diffracted light ray 12 encountering said walls 41a is directly reflected in the direction of the matrix 20 of photo detectors 21 locate regarding said walls 41a. The angle β of inclination of the walls 41a is shown in FIGS. 8b and 8c.

FIGS. 7a and 7b thus show the optical path of the extracted 11 and diffracted 12 light rays from the extraction network 10a to the matrix 20 of photo detectors 21. The extracted light rays 11 coming from the extraction network 10a and the diffracted light rays 12, are reflected off the walls 41a of the second portion 50b of the channel 50, allowing the measurement thereof by the photo detectors 21.

As the walls 41a are inclined, it is possible to ensure that the reflected extracted light rays 13 and the reflected diffracted light rays 14 arrive with an angle of incidence that is quasi-normal to the surface of the matrix 20 of photo detectors 21.

This geometry has the advantage of not deforming the front of the light diffracted by projection off the matrix 20 of photo detectors 21, i.e. the diffraction diagram 70 of the particles 60. In this situation, the digital processing of the diffraction diagram 70 measured is simplified, because the geometric corrections to be made are low, even nonexistent.

Note that in light of the method of forming the second portion 50b of the channel 50, the wall 41a of this second portion 50b of the channel 50, passing through the second substrate 40, has a cylindrical or parallelepiped shape.

In the case of a dry etching, the wall 41a can have a vertically extruded shape.

In the case of a wet etching, the wall 41a can have a pyramidal shape.

Preferably, the wall 41a will have a pyramidal shape making it possible to have inclinations around the axis z so as to allow for the reflection of the incident light rays while still retaining a planar surface on the wall 41a in such a way as to not deform the front of the light. Thus, the wet etching is an advantageous embodiment.

Advantageously, a portion only or the entire surface of this wall 41a can be used for the reflection of the extracted 11 and diffracted 12 light rays.

Figure 8A:
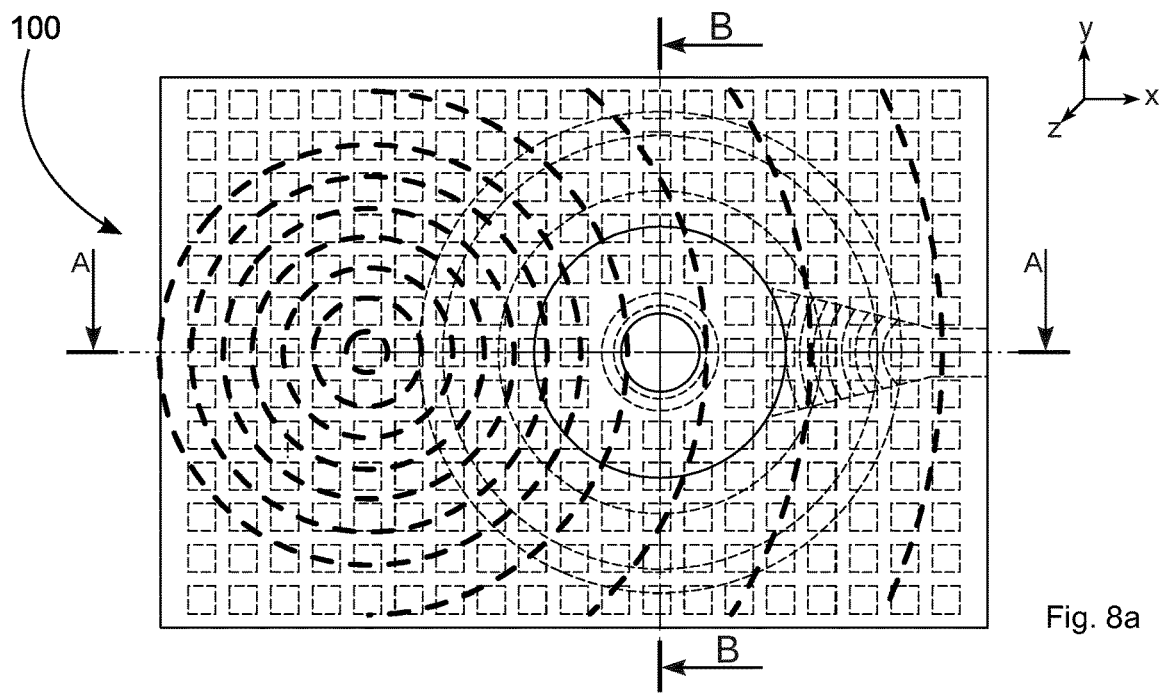
FIG. 8a is a top view of an alternative of the embodiment of FIG. 7a wherein photo detectors are distributed over an entire substrate in such a way as to cover a larger detection surface area.
Figure 8B:
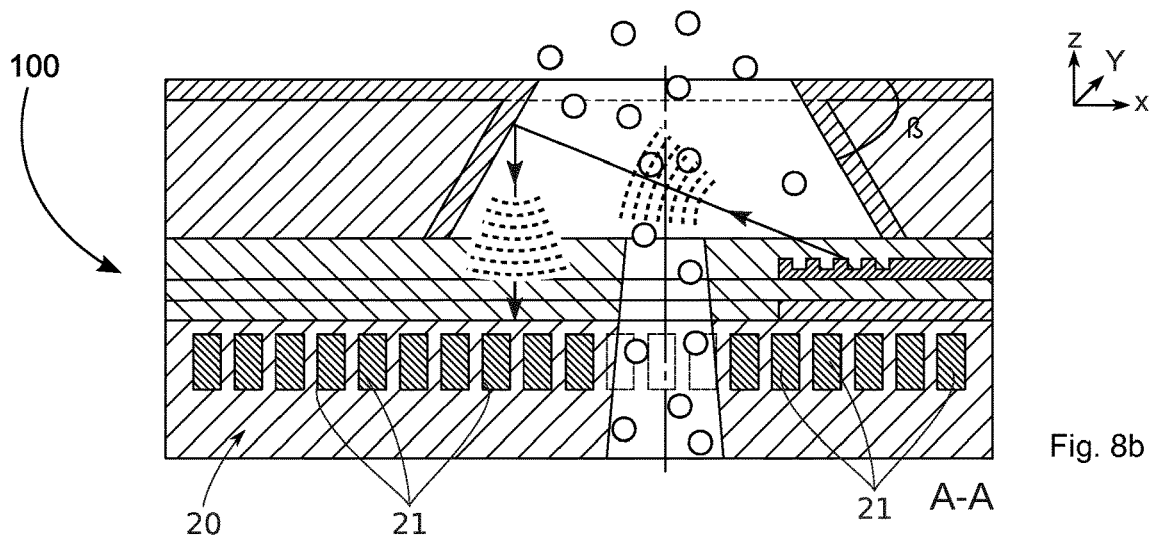
Figure 8C:
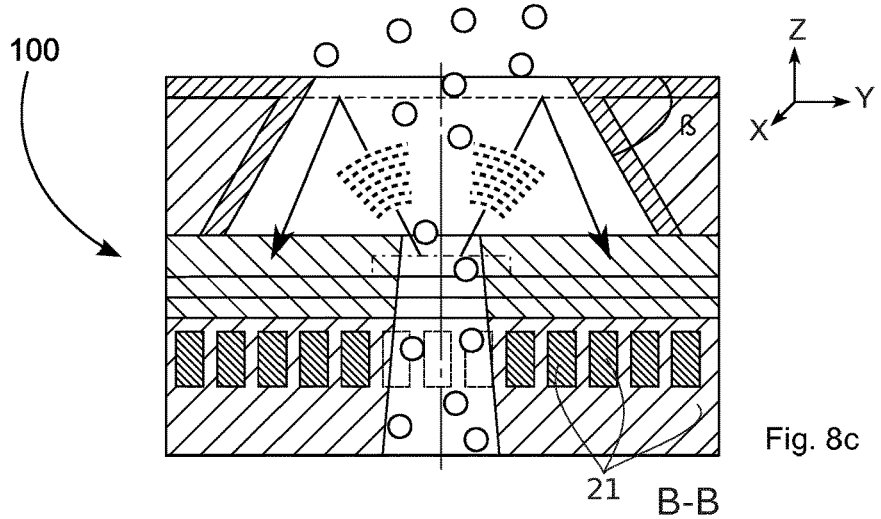

According to an embodiment, the matrix 20 of photo detectors 21 can be positioned all around the channel 50 for the circulation of particles 60 as shown through FIGS. 8a and 8b and this in such a way as to extend the detection zone to diffracted light rays 12 and 14 and to backscattered rays. Identically to the embodiment shown through FIGS. 2a and 2b, this makes it possible to have a larger detection surface area and to measure the diffraction diagram 70 as a whole. FIG. 8b shows along the section B-B of FIG. 8a, the diffracted light rays 12 propagating in multiple directions all around the principal direction (z) of extension of the channel 50.

Particularly advantageously, the angle that the walls 41a of the channel 50 form with the surface of the second substrate 40 parallel to the principal plane (x, y) can be perfectly controlled during manufacture. Indeed, in the case of the wet etching of a crystalline material for example, the etching planes can be foreseen and therefore this angle can easily be known and controlled.

Thus for example in the case of a second substrate 40 made of silicon, a wet etching with a KOH base causes the formation of walls 41a of which the angle β in relation to principal plane (x, y) is substantially equal to 54.7°. β is shown in FIGS. 8b and 8c.

In addition, the angle of incidence of the extracted light rays 11 on the reflecting layer 41 deposited on the walls 41a is also perfectly known and mastered since the latter depends on the configuration of the extraction network 10a.

Therefore, the angle of incidence on the matrix 20 of photo detectors 21 is also perfectly known by simple geometrical construction. Thus, through the inclination of the walls 41a of the second portion 50b of the channel 50, the angle of incidence of the reflected extracted rays 13 and of the reflected diffracted light rays 14 can be close to the normal (z) with respect to the principal plane (x, y), i.e. with respect to the plane of the matrix 20 of photo detectors 21.

In reference to FIGS. 4e to 4h and 9a to 9f, the method of producing at least one particle detector 60 shall now be described according to this second embodiment shown in FIGS. 7a to 8c.

The steps described in the preceding FIGS. 4a to 4h are identical for this second embodiment and allow for the formation and the structuring of the first substrate 30.

Figure 9A:
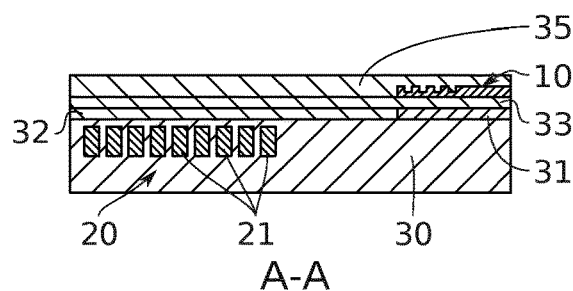
FIGS. 9a to 9f show the steps of carrying out the detector shown in FIGS. 8a to 8c.
Figure 9B:
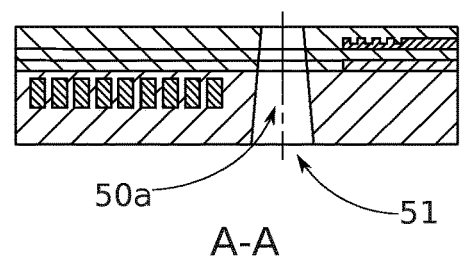

As shown in FIGS. 9a and 9b, once the first substrate 30 is suitably formed and structured, an orifice is made in such a way as to form the first portion 50a of the channel 50, i.e. the one passing through the first substrate 30.

This formation can comprise an etching of the first substrate 30. This etching is carried out preferably between the distal portion 10 of the waveguide and the matrix 20 of photo detectors 21.

Figure 9C:
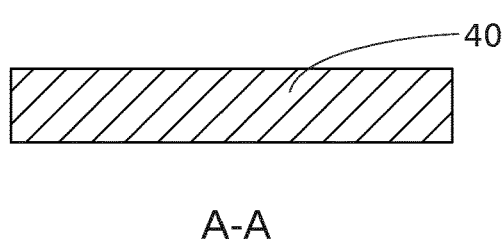
Figure 9D:
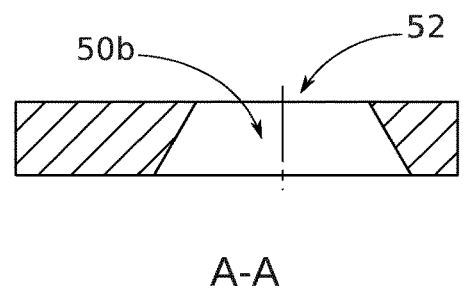
Figure 9E:
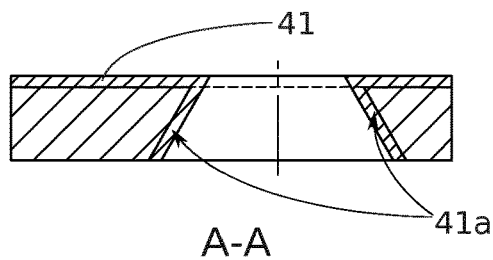

FIGS. 9c to 9e show the formation and the structuring of the second substrate 40 through the formation of a second portion 50b of the channel 50 for the circulation of particles 60 through the second substrate 40. This second portion 50b is advantageously carried out by etching, and preferably by wet etching. Indeed, wet etching makes it possible to have inclined surfaces of which the advantages are indicated hereinabove.

Once this second portion 50b is formed, a reflecting layer 41, of the metal type, with an aluminium or copper base for example, is deposited principally on the walls 41a of the second portion 50b of the channel 50.

Figure 9F:
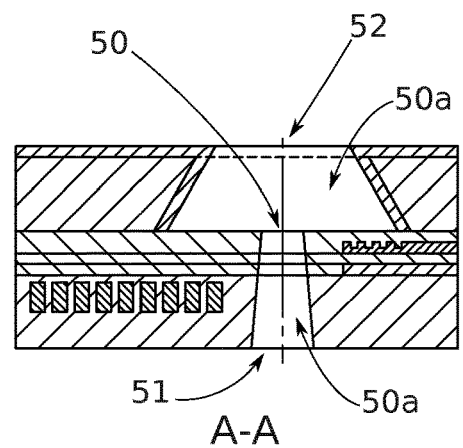

As shown in FIG. 9f, once this second portion 50b of the channel 50 is carried out and the walls 41a thereof covered with a reflecting layer 41, the substrate 100 is formed by assembly of the second substrate 40 with the first substrate 30 in such a way as to form a channel 50 for the circulation of particles 60 defined by the joining of the first and second portions 50a and 50b of the channel 50. As hereinabove this assembly can be carried out by a molecular bonding.

This second embodiment, in addition to having many advantages in common with the first embodiment, makes it possible to reduce to a minimum the roughness of the channel 50 by the clever use of a wet etching carried out on a crystalline material.

For example, the quasi-total absence of roughness of the channel 50 is indeed possible by the wet etching of the silicon by a chemistry with a KOH base, with this etching being without roughness since it is carried out according to the crystalline planes of the silicon.

In addition, this second embodiment makes it possible to obtain a direction of propagation of the reflected extracted rays 13 and of the diffracted light rays 14 that is quasi-normal, i.e. substantially along the axis (z), to the surface of the photo detectors 21, i.e. the principal plane (x, y).

This situation has the advantage of giving a direct image of the diffraction diagram 70 of the particles 60, without deformation due to the projections which must otherwise be corrected by computer and/or electronically by processing of signals measured by the matrix 20 of photo detectors 21.

In addition, in the case of backscattered rays, i.e. in the case where the particles 60 have a large size with respect to the wavelength of the luminous radiation used, extracted light rays 11 can be backscattered. In this case also, it is possible to adapt the present invention so that the angle of extraction a is such that the extracted light rays 11 have a principal direction of extraction substantially parallel to the direction z and are directed to the outlet orifice 52 of the channel 50, i.e. with an angle α substantially equal to 90°.

In this case, the matrix 20 of photo detectors 21 detects only the light rays diffracted 12 and 14 and backscattered by the particles 60.

Through FIGS. 10 and 11 shall now be described two embodiments that have, in addition to the advantages mentioned hereinabove, the advantage of allowing the present invention to operate even when the channel 50 for the circulation of particles 60 would be entirely or partially clogged.

Indeed, it can be considered that the channel 50 be clogged over time by very large particles, dust for example, or insects. It is also possible that the method of production generates defects in the channel, leading to the total or partial obstruction thereof.

The two non-limiting embodiments that shall be presented now make it possible to respond to this problem.

Figure 10:
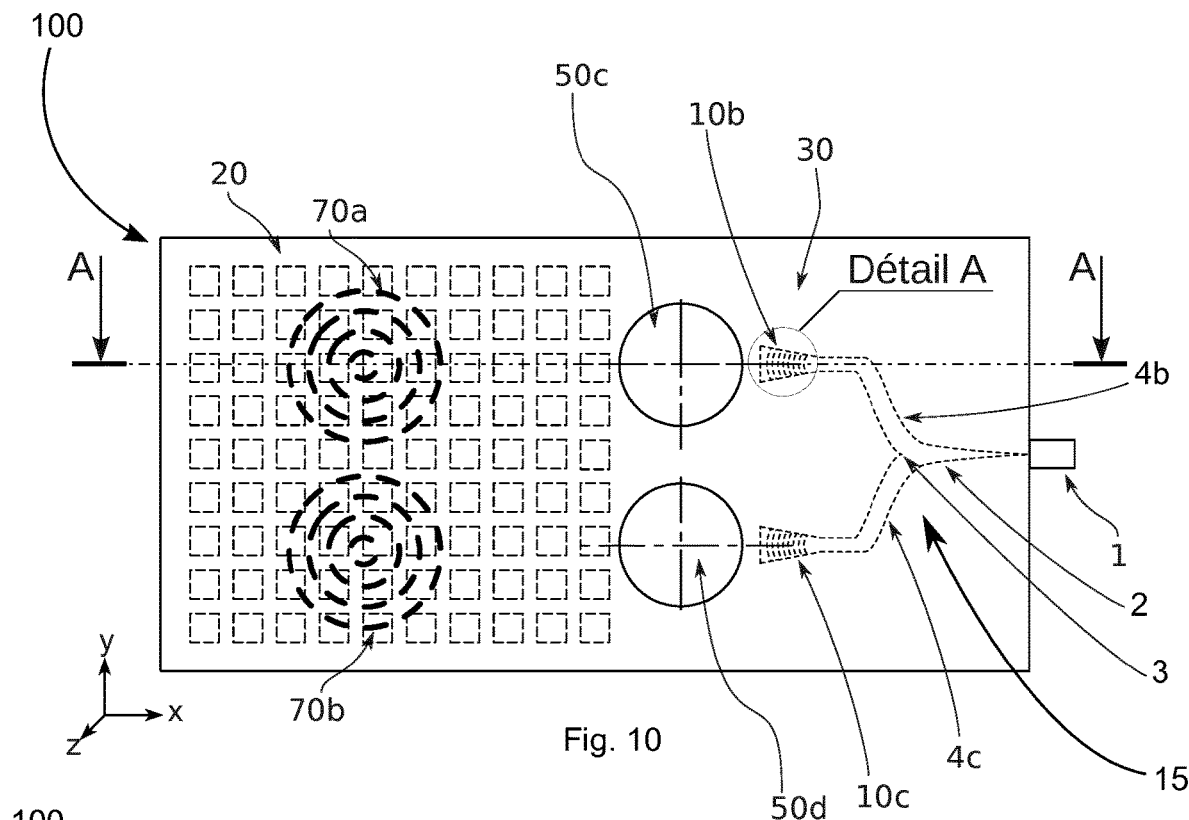
FIGS. 10 and 11 show two embodiments of the present invention wherein the substrate comprises two channels for the circulation of particles. In these figures, a projection of the diffraction diagrams of light rays by particles is sketched. These figures show the possible arrangements of a matrix of photo detectors with respect to the two channels for the circulation of particles. In these figures, the optical device comprises a waveguide that separates into two arms.
Figure 11:
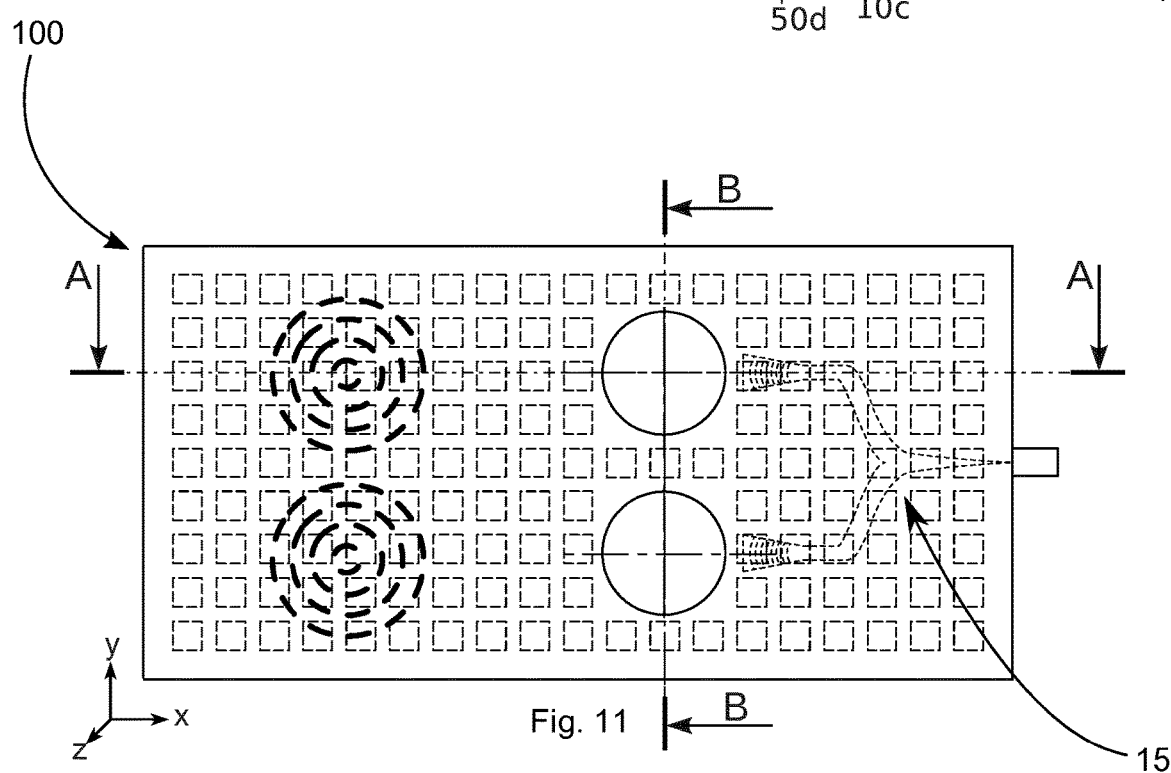

In addition, the two embodiments shown in FIGS. 10 and 11 are advantageously combined together with the preceding embodiments.

FIGS. 10 and 11 show a substrate 100 comprising a first 50c and a second 50d channel for the circulation of particles 60.

According to these two embodiments, in the case where a channel among the first 50c and the second 50d is clogged, the channel that is not clogged allows the present invention to continue to operate.

In FIGS. 10 and 11, a single light source 1 in the form of a light-emitting diode for example has been shown. This light source 1 is configured to emit a luminous radiation. The optical device 15 is advantageously configured to include this light source 1 or to be apt to connect thereto. The optical device 15 and the light source 1 cooperate in such a way that this luminous radiation is guided in the waveguide 2.

Preferably, the waveguide 2 can have one or several junctions 3 in such a way as to form a plurality of arms 4b and 4c.

FIGS. 10 and 11 show the case of a single junction 3 that allow for the formation of a first arm 4b of the waveguide 2 and of a second arm 4c of the waveguide 2.

In the case of FIGS. 10 and 11, a distal portion 10b of the first arm 4b and a distal portion 10c of the second arm 4c of the waveguide 2 are shown. Preferably, each one of these distal portions 10b, 10c forms or carries an extraction network as for the embodiments described hereinabove.

Identically to the preceding embodiments, the first channel 50c, the matrix 20 of photo detectors 21 and the distal portion 10b of the first arm 4b of waveguide 2 are arranged in such a way that a portion at least of the luminous radiation emitted on the distal portion 10b of the first arm 4b of waveguide 2 passes through the first channel 50c by being diffracted by at least one particle 60, then reflects off the reflecting surface 41, then reaches the matrix 20 of photo detectors 21.

Likewise, the second channel 50d, the matrix 20 of photo detectors 21 and the distal portion 10c of the second arm 4c of waveguide 2 are arranged in such a way that a portion at least of the luminous radiation emitted on the distal portion 10c of the second arm 4c of waveguide 2 passes through the second channel 50d by being diffracted by at least one particle 60, then reflects off the reflecting surface 41, then reaches the matrix 20 of photo detectors 21.

Advantageously, a single matrix 20 of photo detectors 21 receives the luminous radiation having passed through all of the channels 50c, 50d. Preferably this matrix 20 is continuous. In FIG. 11, the matrix 20 extends all around the channels 50c, 50d.

All of the characteristics described for the preceding embodiments shown by FIGS. 1 to 9 can be applied to the embodiments of FIGS. 10 and 11 and to the alternatives thereof.

Figure 12:
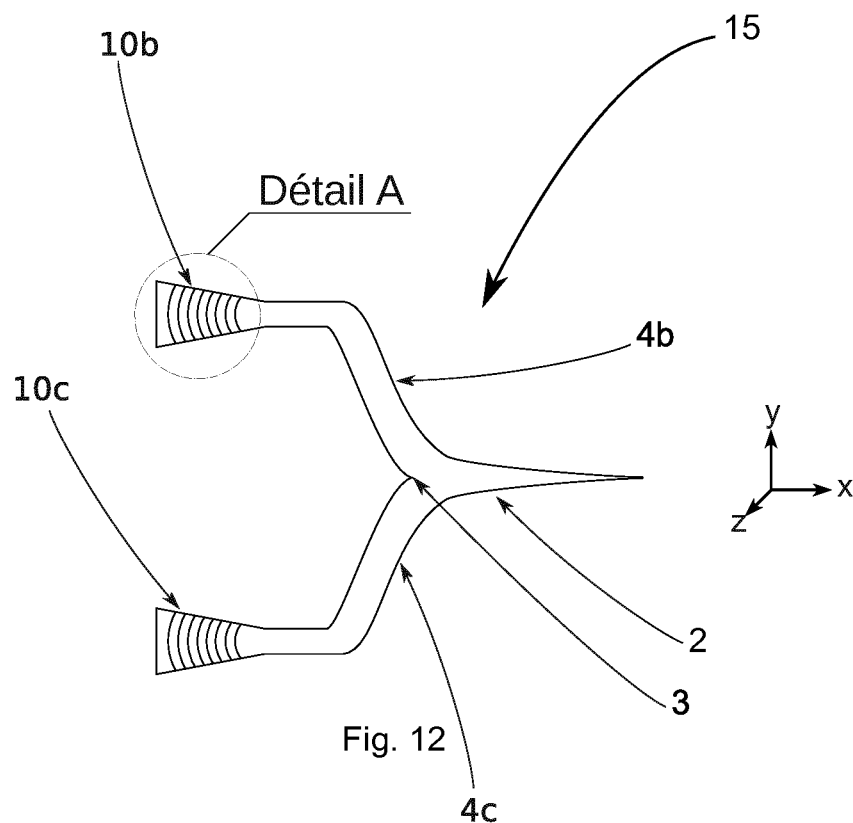
FIGS. 12 and 13 show an optical device according to two embodiments of the present invention. In these figures, the optical device comprises a waveguide that separates into two arms.
Figure 13:
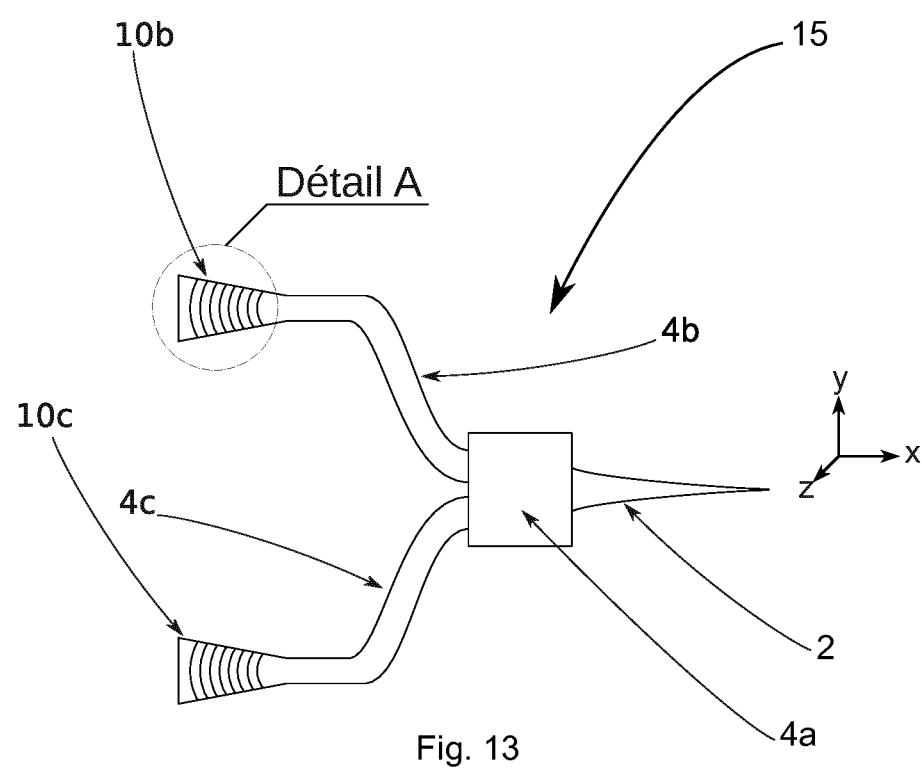

FIGS. 12 and 13 describe two embodiments of the waveguide 2 of the optical device 15 and particularly two embodiments of the junction 3 in such a way as to form the first arm 4b and the second arm 4c.

FIG. 12 shows the formation of the first arm 4b and of the second arm 4c via a single separating junction 3 on the waveguide 2.

FIG. 13 shows an advantageous embodiment wherein the junction 3 is carried out by an interferometer 4a, preferably multimode, thus making it possible to provide this optical device 15 with a better robustness to technological imprecision.

As a non-limiting example, the following numerical values and dimensions can be adapted to the various elements of the present invention:

The distance, along the direction (z) perpendicular to the principal plane (x, y) wherein the substrate 100 extends, between the matrix 20 of photo detectors 21 and the reflecting surface 41 is between 10 µm and 10 mm, preferably between 100 µm and 1 mm and advantageously between 500 µm and 1 mm.

- This makes it possible to maximise the flux of diffracted light rays in the direction of the reflecting surface as well as in the direction of the matrix of photo detectors.
- The length of the channel 50 for the circulation of particles 60 is between 100 µm and 10 mm, preferably between 100 µm and 5 mm and advantageously between 500 µm and 2 mm.
- The diameter of the first portion 50a of the channel 50 for the circulation of particles 60 according to the direction y is between 10 µm and 10 mm, preferably between 100 µm and 5 mm and advantageously between 500 µm and 2 mm.
- The channel 50 extends according to a principal direction (z) of circulation of said particles 60 and the luminous radiation, at the outlet of the optical device 15, has a principal direction of propagation forming with the principal direction for the circulation of particles 60 an angle α between 0 and 90°, preferably between 10° and 75° and advantageously between 10° and 45°.
- This makes it possible to optimise the volume of interaction between the particles and the luminous radiation in such a way as to optimise the number of diffracted light rays, thus improving the detection of particles.
- In addition, the waveguide can be or not at the same vertical level as the matrix of photo detectors.
- With the purpose of simplifying the method of manufacturing of the present invention, the waveguide is situated at a raised level with respect to the matrix of photo detectors.
- Preferably, the luminous radiation comprises a wavelength between 400 nm and 2 µm, preferably between 500 nm and 1.6 µm and advantageously between 600 nm and 1 µm.
- This makes it possible to have a luminous radiation in the visible light range, simplifying among other things the implementation and the maintenance thereof.
- In addition, the diffraction of the extracted light rays is all the more so substantial when the wavelength of the luminous radiation is low at a given particle size.
- The diameter w of the waveguide is between 100 nm and 1 µm, preferably between 200 nm and 800 nm and advantageously between 300 nm and 600 nm.
- The thickness h of the waveguide is between 100 nm and 1 µm, preferably between 200 nm and 800 nm and advantageously between 300 nm and 600 nm.
- The extension length L of the distal portion 10 of the waveguide is between 10 µm and 10 mm, preferably between 100 µm and 5 mm and advantageously between 1 mm and 3 mm.
- The dimension D of the distal portion 10 of the waveguide is between 10 µm and 10 mm preferably between 100 µm and 5 mm and advantageously between 1 mm and 3 mm.
- The lower reflecting layer 31 has a thickness between 10 nm and 10 µm, preferably between 50 nm and 1 µm and advantageously between 100 nm and 300 nm.
- The first layer of oxide 32 has a thickness between 10 nm and 10 µm, preferably between 50 nm and 1 µm and advantageously between 100 nm and 300 nm.
- The buffer layer 33 has a thickness that can be between 10 nm and 10 µm, preferably between 50 nm and 5 µm and advantageously between 100 nm and 1 µm.
- The guide layer 34 has a thickness between 100 nm and 1 µm, preferably between 200 nm and 800 nm and advantageously between 300 nm and 600 nm.
- The second layer of oxide 35 has a thickness between 0.1 nm and 10 µm, preferably between 1 nm and 1 µm and advantageously between 10 nm and 500 nm.
- The reflecting layer 41 has a thickness between 10 nm and 10 µm, preferably between 50 nm and 1 µm and advantageously between 100 nm and 300 nm.
- The walls 41a of the second portion 50b of the channel 50 have an angle with the perpendicular direction (z) between 5° and 75°, preferably between 10° and 65° and advantageously between 15° and 55°.
- The first substrate comprises at least one material taken from: silicon, III-V materials, for example GaN, InP making it possible to integrate the source of light into the substrate itself.
- The second substrate comprises at least one material taken from: glass, silicon.
- The optical device 15 comprises a core and a sheath, the core comprising at least one material taken from: silicon nitride (SiN), titanium dioxide ($TiO_2$) and the sheath comprising at least one material taken from: silica, $MgF_2$, $Al_2O_3$.
- The reflecting surface 41 comprises at least one material taken from: aluminium, Copper, Silver, Gold.

The implementation of the present invention can comprise the use of various mathematical and computer tools in order to extract from the measurements of the photo detectors, intrinsic parameters of the particles such as their size for example. Those skilled in the art can find such tools in the following references:

"The Mie Theory: Basics and Applications"; Wolfram Hergert, Thomas Wriedt; Springer, 30 Jun. 2012-259 pages, and "Light scattering and surface plasmons on small spherical particles", Xiaofeng Fan, Weitao Zheng and David J Singh, Light: Science & Applications (2014) 3.

The invention is not limited to the embodiments described but extends to any embodiment in accordance with its spirit.

In particular, it is to be noted that the present invention can also be applied to liquid fluids conveying particles. Thus, in the present description, a "Fluid" means a body of which the constituents, the particles for example, have little adhesion and can freely slide on one another, in the case of liquids, or be displaced independently of each other, in the gas of a gas. According to this definition, air is a fluid, as well as water. A fluid can transport particles, such as micrometric and nanometric particles transported by the air for example.

The matrix of photo detectors can advantageously be periodic or aperiodic and have a polygonal or circular shape.

The present invention can also be applied to the case of one or several channels for the circulation of particles that are possibly open according to a longitudinal direction. Thus, the contour of the channel or channels is not closed.

Moreover, the section of the channel in the plane (x, y) is not necessarily circular. Advantageously, it can be polygonal, for example rectangular or square.

REFERENCES

1. Light source
2. Waveguide
3. Junction
4a. Interferometer
4b. First arm of the waveguide
4c. Second arm of the waveguide
10. Distal portion of the waveguide
10a. Extraction network
10b. Distal portion of the first arm of the waveguide
10c. Distal portion of the second arm of the waveguide
11. Extracted light rays
12. Diffracted light rays
13. Reflected extracted light rays
14. Reflected diffracted light rays
15. Optical device
20. Matrix of photo detectors
21. Photo detector(s)
30. First substrate
31. Lower reflecting layer
32. First layer of silicon oxide
33. Buffer layer
34. Guide layer
35. Second layer of silicon oxide
36. Layer of resin
37. Opening of the formation of the first portion of the channel
40. Second substrate
41. Reflecting layer
41a. Wall covered with a reflecting layer
42. Opening of the formation of the second portion
50. Channel for the circulation of particles
50a. First portion of the channel
50b. Second portion of the channel
50c. First circulation channel
50d. Second circulation channel
51. Inlet orifice of the channel
52. Outlet orifice of the channel
60. Particle(s)
70. Diffraction diagram
70a. First diffraction diagram
70b. Second diffraction diagram
100. Substrate

The invention claimed is:

1. A particle detector comprising:
    an optical device able to be connected to at least one light source and configured to emit at least one luminous radiation generated by said light source; and
    a substrate extending in a principal plane and defining a portion at least of at least one channel intended to receive a fluid comprising particles, said at least one channel extending principally in a direction perpendicular to the principal plane, a portion at least of the substrate being configured to receive a portion at least of the luminous radiation emitted by the optical device;
    wherein the detector further comprises a matrix of photo detectors and at least one reflecting surface;
    the matrix of photo detectors being arranged in a first plane and the reflecting surface being oriented in a second plane, said first and second planes being parallel to the principal plane and situated on either side of said portion of the substrate, so that a portion at least of the luminous radiation emitted by the optical device passes through said at least one channel by being diffracted by at least one particle, then reflects off the reflecting surface, and then reaches the matrix of photo detectors.

2. The detector according to claim 1 wherein the optical device is situated at least partially between said first and second planes.

3. The detector according to claim 1 wherein the substrate has a first face turned facing or arranged in contact with the reflecting surface and wherein the substrate has a second face, opposite the first face and turned facing or arranged in contact with the matrix of photo detectors.

4. The detector according to claim 1 wherein the matrix of photo detectors and the reflecting surface are situated at least partially and in line with one another along said perpendicular direction.

5. The detector according to claim 1 configured so that a portion at least of the luminous radiation is reflected by a portion at least of the reflecting surface before passing through said at least one channel to be diffracted by at least one particle.

6. The detector according to claim 1 wherein the substrate is formed from at least one material allowing at least 50% of said luminous radiation to pass.

7. The detector according to claim 1 wherein the optical device has a distal portion through which the luminous radiation is emitted and wherein the distal portion and the matrix of photo detectors are situated on either side of said at least one channel with respect to said perpendicular direction.

8. The detector according to claim 1 wherein the optical device and the matrix of photo detectors are arranged in the substrate.

9. The detector according to claim 1 wherein the optical device and the matrix of photo detectors are arranged outside of the at least one channel in such a way as to be protected from a direct contact with the fluid comprising particles.

10. The detector according to claim 1 wherein the matrix of photo detectors extends around said at least one channel by covering an arc of circle of at least 180°.

11. The detector according to claim 1 wherein the substrate comprises at least a first substrate and a second substrate, the first substrate bearing the matrix of photo detectors and a portion of the optical device and the second substrate bearing at least the reflecting surface.

12. The detector according to claim 1 wherein the substrate comprises at least a first substrate and a second substrate, the first substrate bearing at least a first portion of said at least one channel and the second substrate bearing at least a second portion of said at least one channel, each portion extending in said perpendicular direction and wherein an average surface area of a cross-section of the first portion is substantially less than or equal to an average surface area of a cross-section of the second portion, an average surface area of the cross-section of a portion corresponding to a mean of surface areas of cross-sections taken over an entire height along the perpendicular direction.

13. The detector according to claim 1 wherein the optical device comprises at least one distal portion shaped to form, at an outlet of the optical device, an extraction network configured to generate a set of extracted light rays and wherein the extraction network has a shape that flares in the principal plane in the direction of said at least one channel.

14. The detector according to claim 1 wherein the optical device comprises at least one waveguide comprising a core that has a distal portion and a sheath covering the core, the core having, on the distal portion, a plurality of grooves arranged periodically according to a pitch P such that P satisfies the following expression:

$$\frac{\lambda}{n_{eff}} \leq P \leq \frac{\lambda}{n_{eff} - n_g}$$

with: $\lambda$ being a wavelength of the luminous radiation;
$n_{eff}$ being an effective index of refraction of a fundamental mode of the luminous radiation;
$n_e$ being an index of refraction of the core of the waveguide;
$n_g$ being an index of refraction of the sheath of the waveguide; and
$n_{eff}$ being between $n_e$ and $n_g$.

15. The detector according to claim 1 wherein the optical device comprises at least one waveguide comprising a core and a sheath and wherein a thickness h of the waveguide measured along said perpendicular direction is such that:

$$h \leq \frac{2\lambda}{\pi\sqrt{n_c^2 - n_g^2}}$$

with: $\lambda$ being a wavelength of the luminous radiation;
$n_e$ being an index of refraction of the core of the waveguide; and
$n_g$ being an index of refraction of the sheath of the waveguide.

16. The detector according to claim 1 comprising at least a first channel and a second channel for circulation of particles, each channel being intended to receive the fluid comprising particles and being configured to receive a portion at least of the luminous radiation emitted by the optical device.

17. The detector according to claim 16, configured in such a way that the luminous radiation received by each channel comes from a single light source.

18. The detector according to claim 1 comprising at least a first and at least a second channel for circulation of particles and wherein the optical device comprises at least one waveguide comprising at least one junction configured to form at least a first arm of the waveguide and at least a second arm of the waveguide, the detector being configured so that:

a portion at least of the luminous radiation emitted by the optical device through the first arm of the waveguide passes through the first channel by being diffracted by at least one particle, then reflects off the reflecting surface, and then reaches the matrix of photo detectors; and a portion at least of the luminous radiation emitted by the optical device through the second arm of the waveguide passes through the second channel by being diffracted by at least one particle, then reflects off the reflecting surface, and then reaches the matrix of photo detectors.

19. A method for producing at least one particle detector according to claim 1, comprising at least the following steps:

supplying at least a first substrate comprising at least one matrix of photo detectors and a portion of at least one optical device configured to emit at least one luminous radiation, the first substrate extending in a principal plane and the matrix of photo detectors extending in a first plane parallel to said principal plane;

supplying at least a second substrate comprising at least one reflecting layer, the second substrate extending partially at least in the principal plane and the reflecting layer extending in a second plane parallel to said principal plane;

forming a third substrate by assembling the first substrate and the second substrate in such a way that the matrix of photo detectors and the reflecting surface are arranged on either side of a portion at least of the substrate; and at least one of before and after the step of forming the third substrate, forming at least one channel for circulation of particles extending principally in the perpendicular direction and passing entirely through the third substrate so that a portion at least of luminous radiation emitted by the optical device passes through the channel by being diffracted by at least one particle, then is reflected off the reflecting surface, and then reaches the matrix of photo detectors.

20. The method according to claim 19 wherein, in a case where the step of forming of said at least one channel is carried out before the step of forming the third substrate, the method comprises the following steps:

forming at least a first portion of said at least one channel through the first substrate in the perpendicular direction and situated in a vicinity of a distal portion of the optical device;

forming at least a second portion of the channel through the second substrate in said perpendicular direction; and depositing at least one additional reflecting layer on at least one portion of the second portion of said at least one channel and preferably on at least one wall of said at least one channel.

* * * * *